(12) United States Patent
Miros et al.

(10) Patent No.: US 8,266,848 B2
(45) Date of Patent: Sep. 18, 2012

(54) PHOTOVOLTAIC MODULE MOUNTING SYSTEM

(75) Inventors: Robert H. J. Miros, Fairfax, CA (US); Margaret Birmingham Mittan, Oakland, CA (US); Martin N. Seery, San Rafael, CA (US); Rodney H. Holland, Novato, CA (US)

(73) Assignee: SunLink Corporation, San Rafael, CA (US)

( * ) Notice: Subject to any disclaimer, the term of this patent is extended or adjusted under 35 U.S.C. 154(b) by 0 days.

(21) Appl. No.: 13/403,620

(22) Filed: Feb. 23, 2012

(65) Prior Publication Data

US 2012/0145228 A1 Jun. 14, 2012

Related U.S. Application Data

(62) Division of application No. 12/587,970, filed on Oct. 15, 2009, now Pat. No. 8,156,697.

(51) Int. Cl.
*E04D 13/18* (2006.01)
(52) U.S. Cl. .................. 52/173.3; 136/244; 126/623
(58) Field of Classification Search .............. 52/173.3, 52/167.7, 167.8; 136/251, 244, 291; 257/433; 126/621, 622, 623; 248/121, 122.1
See application file for complete search history.

(56) References Cited

U.S. PATENT DOCUMENTS

| | | | |
|---|---|---|---|
| 3,947,138 A | 3/1976 | Eshelman | |
| 5,205,072 A | 4/1993 | Eutebach | |
| 5,356,675 A | 10/1994 | Unger et al. | 428/34 |
| 5,588,181 A | 12/1996 | Sutton | |
| 5,732,180 A | 3/1998 | Kaplan | |
| 5,746,839 A | 5/1998 | Dinwoodie | |
| 5,867,869 A | 2/1999 | Garrett et al. | 16/252 |
| 6,063,996 A | 5/2000 | Takada et al. | |
| 6,099,097 A | 8/2000 | Hocker et al. | 312/327 |
| 6,481,055 B2 | 11/2002 | Cheng | 16/252 |
| 6,560,821 B2 | 5/2003 | Miller et al. | |
| 6,570,084 B2 | 5/2003 | Dinwoodie | |
| 6,766,561 B1 | 7/2004 | Cheng | 16/235 |
| 6,809,251 B2 | 10/2004 | Dinwoodie | |
| 6,968,654 B2 | 11/2005 | Moulder et al. | |
| 7,114,292 B2 | 10/2006 | Chiang | 49/388 |
| 7,188,390 B2 | 3/2007 | Cheng | 16/252 |
| 7,240,400 B2 | 7/2007 | Bonham | |
| 7,305,797 B2 | 12/2007 | Chiang | |
| 2003/0000569 A1 | 1/2003 | Zwanenburg | |
| 2003/0070368 A1 | 4/2003 | Shingleton | |
| 2003/0098056 A1 | 5/2003 | Fronek et al. | |
| 2003/0101662 A1 | 6/2003 | Ullman | 52/27 |
| 2004/0250491 A1 | 12/2004 | Diaz et al. | |
| 2005/0005534 A1 | 1/2005 | Nomura et al. | |
| 2005/0115176 A1 | 6/2005 | Russell | |
| 2006/0053706 A1 | 3/2006 | Russell | |
| 2006/0118163 A1 | 6/2006 | Plaisted et al. | |
| 2006/0288645 A1 | 12/2006 | Konstantino et al. | |
| 2007/0120381 A1 | 5/2007 | Ehrensvard et al. | 292/307 R |
| 2008/0083087 A1 | 4/2008 | Lin | |
| 2009/0199846 A1 | 8/2009 | Collins et al. | 126/601 |

*Primary Examiner* — William Gilbert
(74) *Attorney, Agent, or Firm* — Reed Smith LLP

(57) ABSTRACT

A solar array mounting system having unique installation, load distribution, and grounding features, and which is adaptable for mounting solar panels having no external frame. The solar array mounting system includes flexible, pedestal-style feet and structural links connected in a grid formation on the mounting surface. The photovoltaic modules are secured in place via the use of attachment clamps that grip the edge of the typically glass substrate. The panel mounting clamps are then held in place by tilt brackets and/or mid-link brackets that provide fixation for the clamps and align the solar panels at a tilt to the horizontal mounting surface. The tilt brackets are held in place atop the flexible feet and connected link members thus creating a complete mounting structure.

9 Claims, 21 Drawing Sheets

PHOTOVOLTAIC MODULE MOUNTING SYSTEM

CROSS-REFERENCE TO RELATED APPLICATION

This is a Divisional of U.S. patent application Ser. No. 12/587,970, filed Oct. 15, 2009 now U.S. Pat No. 8,156,697.

This invention was made with U.S. Government support under Contract No. DE-FC36-07GO17047 awarded by the Department of Energy. The Government has certain rights in this invention.

BACKGROUND OF THE INVENTION

1. Field of the Invention

The present invention relates generally to a system for mounting and installing photovoltaic solar panels, and more particularly, to a photovoltaic solar panel to mounting support system providing enhanced attachment features for solar panels having no external frame.

2. Description of the Related Art

With the continual rise in conventional energy costs, photovoltaic solar panels ("PV panels") are increasingly becoming cost competitive with other types of energy generation. These PV panel systems are being installed in sites of high energy usage, such as on commercial building rooftops, in industrial open areas, and in proximity to substations tied to the electric grid. These commercial energy systems, or power plants, vary in size but can cover many thousands of square feet on a building rooftop and many acres of land when installed on the ground. Roof mounted systems are particularly attractive in that business owners can elect to offset the energy consumption of their facilities through the use of existing space on the tops of their buildings.

However, such large solar arrays require a sufficiently strong support structure to support not only the weight of the array, but to also provide sufficient resistance to wind forces. Tightly spaced panels effectively form a large surface area, which could result in damage to the panels, the support structure, or both, under strong wind conditions. In addition these systems must accommodate a variety of roof types including built-up roof membranes, monolithic, synthetic membranes, and shingled, mineral surfaces. In order to respond to a variety of roof deck surfaces the mounting structures must provide flexibility in contact elements and attachment systems. These systems must balance the benefits of greater weight, or ballast, to resist wind forces and the load limits of the buildings upon which they are being placed which in many cases were designed to take people walking on them but not the additional load of a large mechanical array.

In many installations, the solar panels are mounted in a "tilted" or inclined to configuration in order to maximize the effective capture of solar radiation, i.e. the solar panels are aligned with the solar angle of incidence. In mounting tilted solar panels, however, the effects of various loads on the mounting surface, such as a roof, must be understood. The loads include standing loads and variable loads, also commonly called dead loads and live loads, respectively.

Standing loads are the result of the combined weight of the solar panels and the mounting system. These standing loads are predictable and are therefore easier to accommodate for during the installation of the solar panels and the mounting system.

Variable loads on the tilted solar panels are mainly caused by environmental conditions, such as wind, rain, snow, hail, etc. Other potential environmental hazards include seismic events, temperature extremes, debris and mold. In order to be able to reliably predict and accommodate variable loads, these environmental problems have to be understood and resolved. The most common and problematic forces are wind-related forces (including hurricanes and tornados), namely lift and drag forces generated by the wind conditions. A variety of mounting systems have been commercially available for mounting solar panels, which have attempted to address and mitigate the wind-induced forces. Most prior mounting systems can be divided into three general categories: non-tilted solar arrays; enclosed tilted solar arrays; and tilted solar panels with wind deflectors attached to every row.

U.S. Pat. No. 5,746,839 (Dinwoodie) and U.S. Pat. No. 6,570,084 (Dinwoodie) are examples of implementations involving non-tilted solar panels. While non-tilted solar panels do present a lower profile with respect to wind forces, they are less efficient at converting solar energy to electrical energy when installed at locations with higher latitudes. Another disadvantage of a non-tilted system is the accumulation of dirt, dust, debris and snow on top of the solar panels, which can further reduce the conversion efficiency of the panels.

U.S. Pat. No. 6,968,654 (Moulder) discloses an example of an enclosed tilted solar panel system. While such a design offers advantages such as improved rigidity, less debris accumulation, and better protection of electrical components, an enclosed solar panel system increase the cost and weight of the system, is likely to increase wind-induced drag forces and also significantly reduces beneficial cooling from natural airflow. The additional heat introduced into the panels by the mounting system results in lower energy output from the photovoltaic panels.

As shown in U.S. Pat. No. 6,063,996 (Takada), U.S. Pat. No. 6,809,251 (Dinwoodie) and U.S. Publication No. 2004/0250491 (Diaz), deflectors may be installed on the north-facing back of every panel in order to reduce the wind-induced uplift forces, when installed in the northern hemisphere. Disadvantages of such systems include significantly increased cost and weight of the installed system. These systems also increase the required labor time for installation in that more parts must be assembled in order to complete the array. In addition, reduced cooling of the solar panels can also significantly reduce the solar conversion efficiency of the system.

It will also be apparent to one skilled in the art that solar panels or modules having extruded metal frames will present different challenges in mounting than those that are produced without additional framing elements. The latter type of solar panels are often referred to as laminates as they are an assembly of one or two sheets of glass along with the photovoltaic material and backing sheet materials to form a laminated assembly. The attachment of these frameless modules, or laminates, is a mechanical challenge often met with the use of clips or hooks that pull one edge of the module into close contact with a supporting structure. Another method of making this connection is to clamp the edge of the module directly and then provide a mounting structure within the sub-structure of the array to hold the module mounting clamp.

SUMMARY OF THE INVENTION

In general, the present invention is a solar array mounting system having unique installation, load distribution, and grounding features, and which is adaptable for mounting solar panels having no external frame. The solar array mounting system includes flexible, pedestal-style feet and rigid links connected in a grid formation on the mounting surface.

The photovoltaic modules are secured in place via the use of attachment clamps that grip the edge of the typically glass substrate. These panel mounting clamps are then held in place by tilt brackets that provide fixation for the clamps and align the PV modules at a tilt to the horizontal mounting surface. The tilt brackets are held in place atop the flexible feet, which are connected by rigid link members, thus creating a complete generally planar mounting structure with the capability of distributing uplift forces along two axes.

More particularly, according to one embodiment of the present invention, the flexible pedestal feet are made of cast, recycled polymers. The link structural members are roll formed steel sections that connect at their ends to threaded mounting rods held in place by a steel cruciform section that is retained in the flexible feet. This overlapping assembly of cruciform base, flexible foot, roll formed steel link, and threaded rod holding the stack up of components together forms a 'node' that allows for the transfer of uplift and down-push forces born by the system as a result of wind pressures and suctions.

According to an embodiment of the present invention the panel clamps comprise two parts, an upper and lower section both made of cast aluminum. These clamp parts are held together by a threaded fastener that is inserted through the top to clamp and threaded into the bottom section of the clamp. The two parts effectively form two mounting posts for mounting the clamp on a bracket. Alternately, the mounting post can be formed as a separate element. The interface between the assembled clamp halves and the module edge is filled by a flexible gasket material. In one embodiment of the invention the flexible gasket is made of EPDM rubber. This gasket has small, finger like protrusions that allow for easy insertion onto the module edge while being reversed makes it more difficult to remove them from the module once installed.

In an alternate embodiment, the panel clamp assembly comprises a molded polymer resin that is resistant to the effects of sustained outdoor exposure. These polymer parts have the clamping edge of the assembly over-molded with a flexible rubber material that creates a better grip on the module material which is typically glass.

In another alternate embodiment, the panel clamp comprises an upper and lower section which are snapped or glued together. Each section includes two slots which align with the mounting openings of a bracket. An internal axle (rod) is held in a channel perpendicular to the slots. The panel clamp mounts to a bracket such that the axle is held in a mounting bracket positioned through the slots.

A solar panel array system according to the present invention comprises at least one solar module having no frame wherein the module is supported by clamps attached at the edges of the module in locations suitable for distributing the loading forces equally. These attachment clamps are held in place by sheet metal tilt brackets that fix the panel in place and hold it at a predefined tilt angle to the horizontal mounting surface. During installation the panel or panels can be inserted into the tilt bracket with a vertical sliding motion whereby the modules, with the clamps pre-affixed, can be lowered into position in the tilt brackets. Once the lower edge of the module is captured by the tilt brackets the top edge of the module is rotated down to the preferred tilt angle. In one embodiment of the invention that preferred tilt angle is 2-5 degrees from the horizontal. As the top edge of the module is lowered to the correct tilt angle the clamps affixed to the top edge of the module locks into place in the next set of corresponding tilt (or mid-link) brackets. The next panel assembled into the array will have its lower edge aligned with the tilt brackets holding the previous solar modules top edge.

In this fashion the same tilt bracket components serve the purpose of holding the top edge of the module course before it and the lower edge of the module course after it. After insertion of the higher edge of the PV module into the top of the tilt brackets a locking cap is inserted to retain the clamps in the tilt brackets and hold the sides the tilt bracket parallel to one another.

The flexible foot, cruciform, and link structure provide a compliant mounting structure that can follow the contour of the mounting surface while simultaneously resisting the uplift and down push forces of wind loading. The link members, which in one embodiment may be made from pre-galvanized, roll formed steel, span the distance between the rubber pedestal feet. The feet provide the contact point with the mounting surface. In the case where that mounting surface is a roof top composed of monolithic waterproofing membrane, the rubber feet provide a semi-rigid, non penetrating load-bearing surface for the interface between the roofing material and the solar array. The added benefit of using a flexible rubber material is that is generates a high coefficient of friction which in turn makes the system more resistant to sliding motion created by wind uplift and seismic forces.

In one embodiment of the present invention, the tilt brackets that support the panel mounting clamps are held in place atop the rubber feet via the anchored ends of the link sections. The link sections come into the feet at right angles to one another—thus forming an orthogonal grid that interconnects the panel array in two directions. The links are captured at their ends by assembly on to a threaded rod which passes through a pre-punched hole in the structural link.

In different variations of the present invention, no mid-link brackets are utilized, one mid-link bracket is positioned between the feet in a first direction, or multiple mid-link brackets are located between feet in a first direction.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1A:
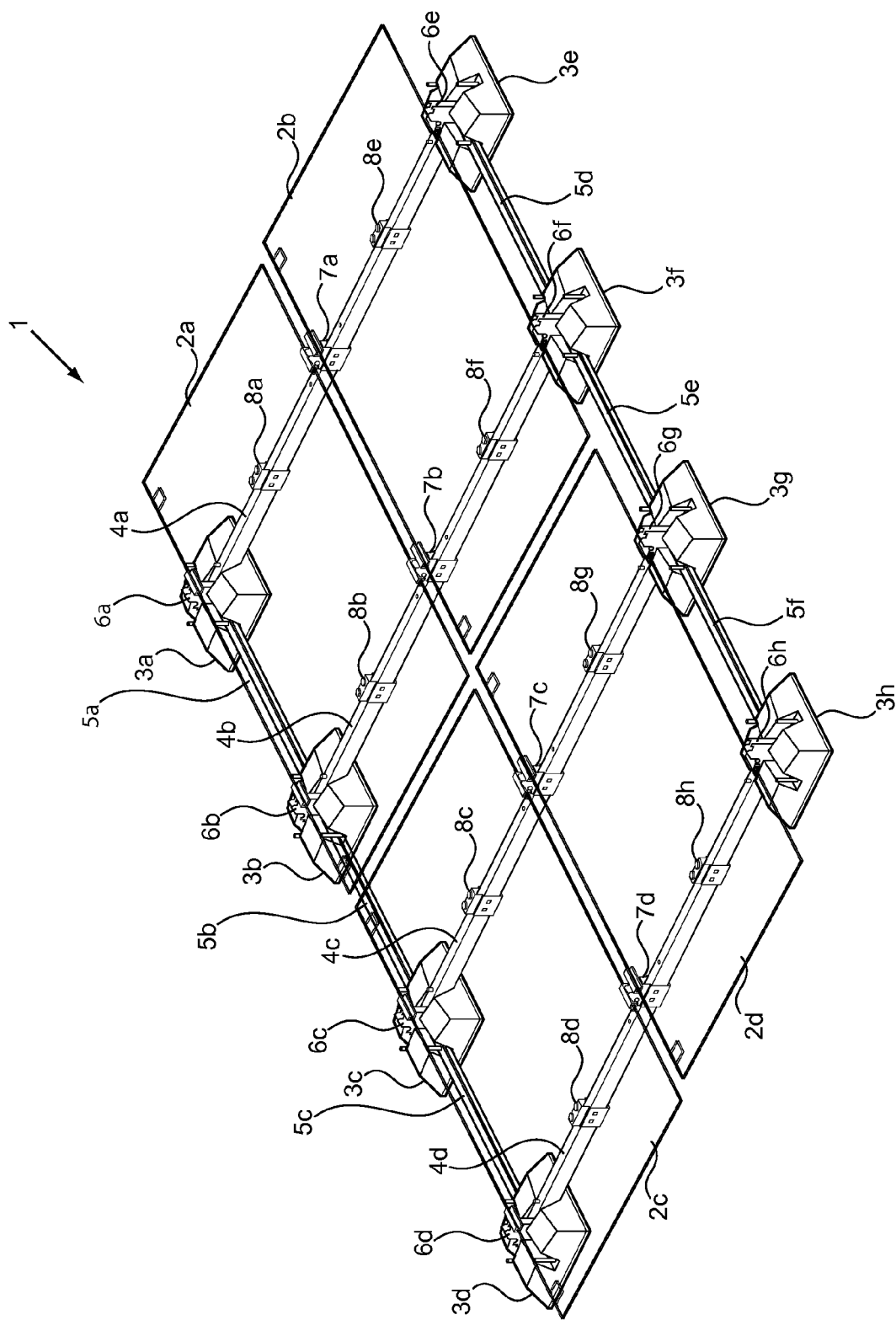
FIG. 1A is a perspective view of the solar panel mounting system according to an embodiment of the present invention.

FIGS. 1A-1D illustrate the basic components and arrangement of the solar array mounting system according to an embodiment of the present invention. FIG. 1A is a perspective view of a solar panel mounting system 1 according to an embodiment of the present invention. Four photovoltaic solar panels 2a-2d are mounted on the mounting structure. The solar panels 2a-2d can be "frameless" panels formed as laminates of two sheets of glass encasing photovoltaic material. For example, the panels 2a-2d may be photovoltaic "thin film" panels. The mounting system 1 includes several flexible feet (or "pedestals") 3a-3h. The feet 3a-3h are the contact points for the system 1 with the mounting surface (roof or ground). Spanning the distance between the feet and the width of two panels 2a, 2b or 2c, 2d are long links 4a-4d. The long links 4a-4d are preferably installed along a North-South axis direction. Connecting the feet along the length of a panel are short links 5a-5f, wherein the short links 5a-5f are preferably installed along an East-West axis direction. The long and short links are preferably formed from roll steel, which is galvanized or powder-coated to prevent corrosion. The panels 2a-2d are mounted to the feet 3a-3h via tilt brackets 6a-6h. At the mid-span of each long link 4a-4d, a mid-link bracket 7a-7d connects to two adjacent panels, 2a, 2b or 2c, 2d. To provide additional support for panels under heavy loads (i.e. snow), center panel supports 8a-8h may be mounted on each long link 4a-4d under the centerline of each panel 2a-2d.

Figures 1B, 1C:
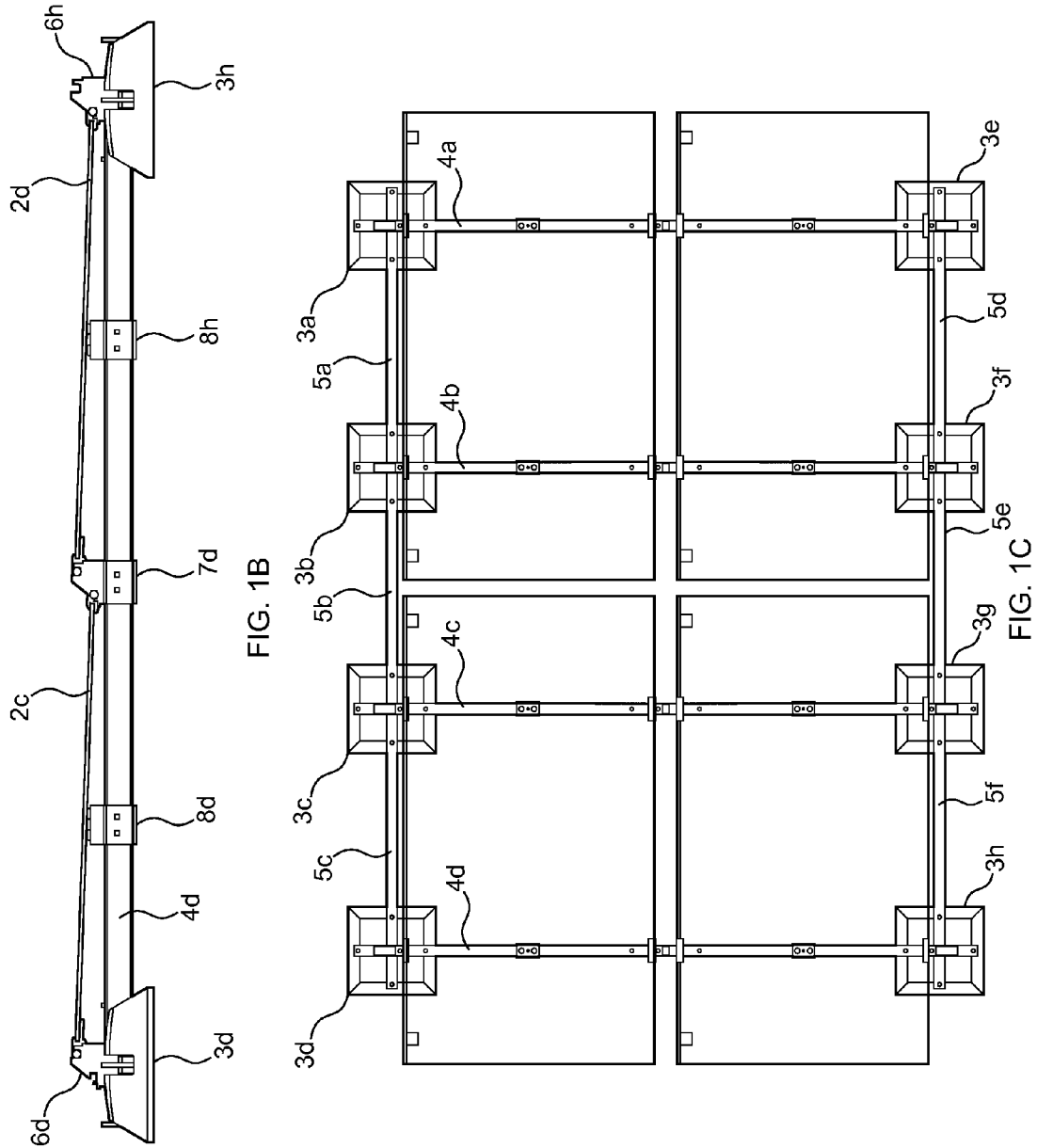
FIG. 1B is a side view of the solar panel mounting system of FIG. 1A.
FIG. 1C is a top view of the solar panel mounting system of FIG. 1A.
Figure 1D:
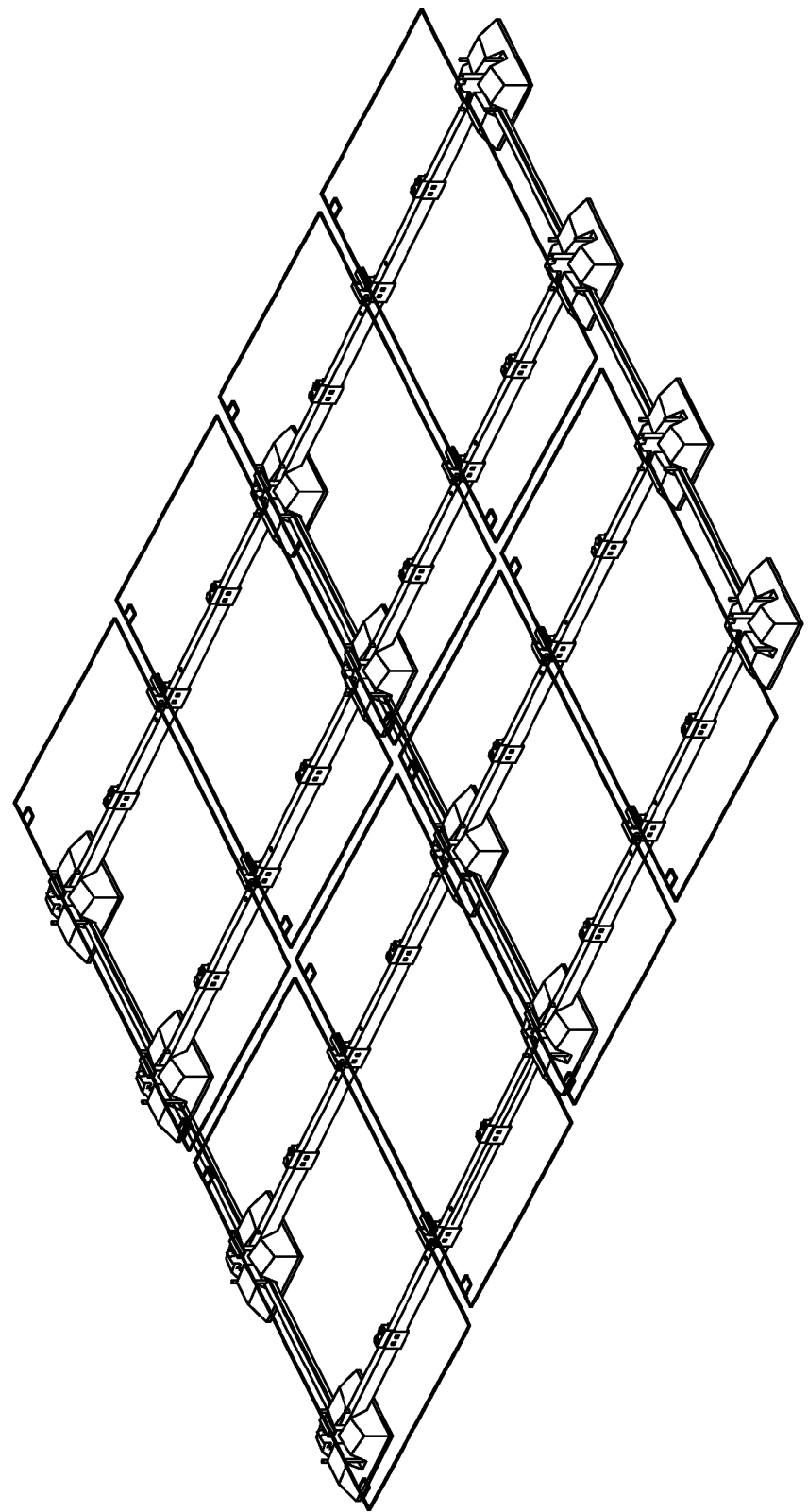
FIG. 1D is an additional perspective view of the solar panel mounting system of FIG. 1A shown with multiple module mounting sections installed.

FIG. 1B shows a side (end) view of the solar panel mounting system of FIG. 1A. Note that the solar panel on the left 2c is mounted higher on the tilt bracket 6d and slopes down to mount to the mid-link bracket 7d. Similarly, the right panel 2d, mounts at the top of the mid-link bracket 7d, and mounts to a lower position on its respective tilt bracket 6h. The angle of tilt for each panel 2c, 2d is preferably in the range of 2°-5°. The center panel supports 8d, 8h are preferably snapped on from the top of the long link 4d, to provide support to the panel. The center panel supports 8d, 8h preferably have rubber feet to abut against the bottom of the panels. FIG. 1C is a top view of the system of FIG. 1A. In a preferred embodiment, the feet 3a-3h are approximately 14 inches square, the long links 4a-4d are 6-7 ft. long, and the short links 5a-5f are 3-4 ft. long. As discussed below, one of the advantages of the present invention is that the size and thicknesses of the linking components can easily be changed to accommodate different installation environments. FIG. 1D further illustrates a 4×2 roof top installation. The mounting system's modular design allows it to be easily adapted to different installation size requirements.

Figure 1E:
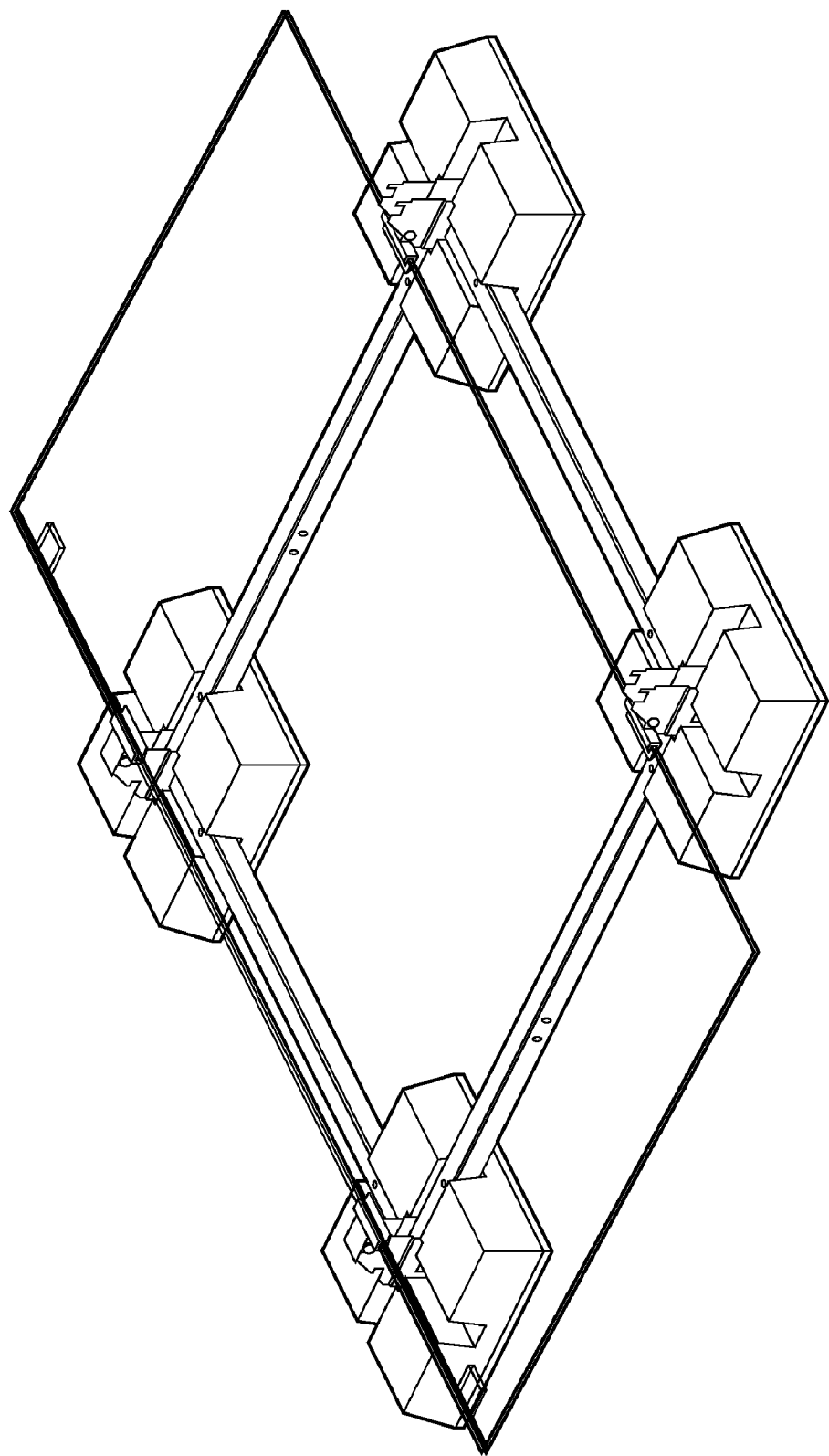
FIG. 1E is a perspective view of an alternate embodiment of the solar panel mounting system, illustrating the components for supporting one panel.
Figure 1F:
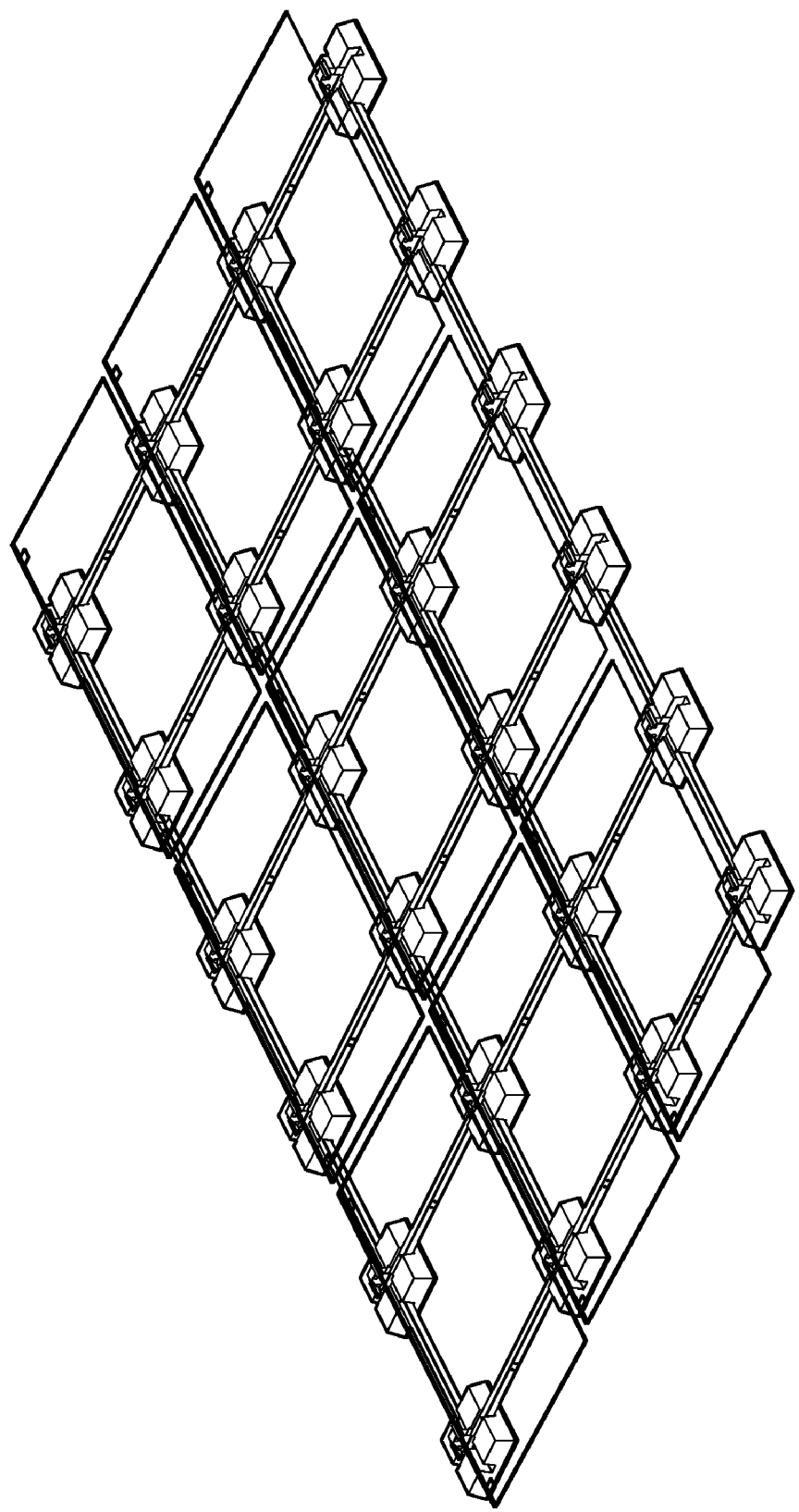
FIG. 1F is a perspective view of the embodiment of FIG. 1E showing a plurality of panels installed on the system.

FIG. 1E illustrates an alternate embodiment of the solar mounting system of the present invention. As shown, each panel is supported by four feet and four links. In this embodiment, note that there are no mid-link brackets, and the feet may be connected using links of a similar size. Such a configuration may be desired in installations having very heavy potential loads. FIG. 1F shows a panel array configured according to the embodiment of FIG. 1E.

Figure 1G:
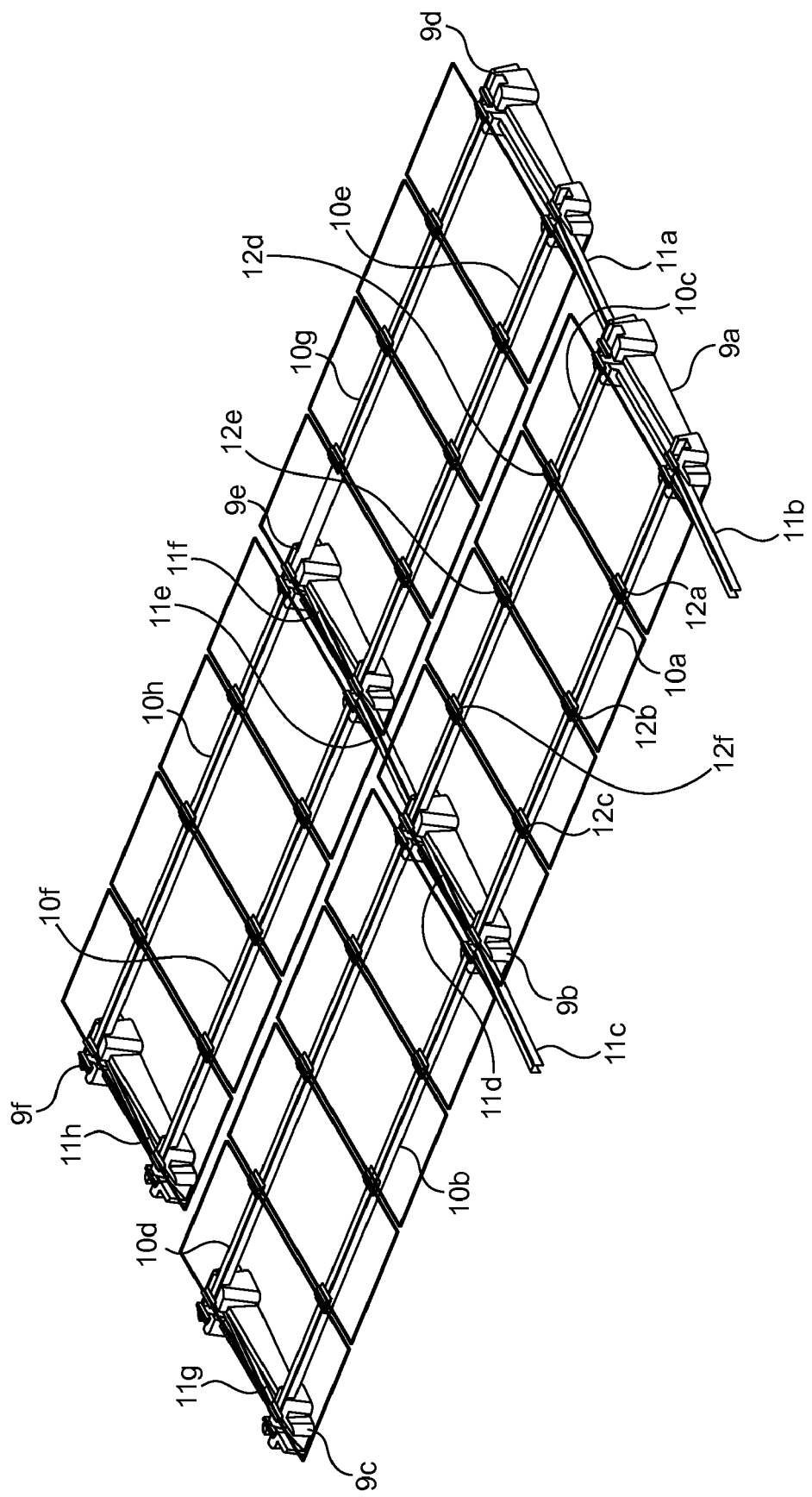
FIG. 1G is a perspective view of another embodiment of the solar panel mounting system according to the present invention.

FIG. 1G illustrates another alternate embodiment of a solar panel mounting system. In this embodiment, the flexible feet 9a-9f may be formed as longer elements effectively spanning two links (i.e. 10a and 10c). The channel formed in the feet between links may itself have a link (i.e. 11d, 11f, 11g, and 11h) or the channel may be empty as shown in feet 9a and 9d. A tilt bracket is installed at each link location in the feet 9a-9f. Multiple mid-link brackets 12a-12f may be installed on the links in each row, such that, for example, four panels are supported between feet elements 9a, 9b. In addition, cross links 11a, 11e can connect feet row-to-row. In another variation, the feet of the embodiment of FIG. 1G may be formed as the separate feet illustrated in the previous embodiments, and the feet connected with links as described above.

Figure 2A:
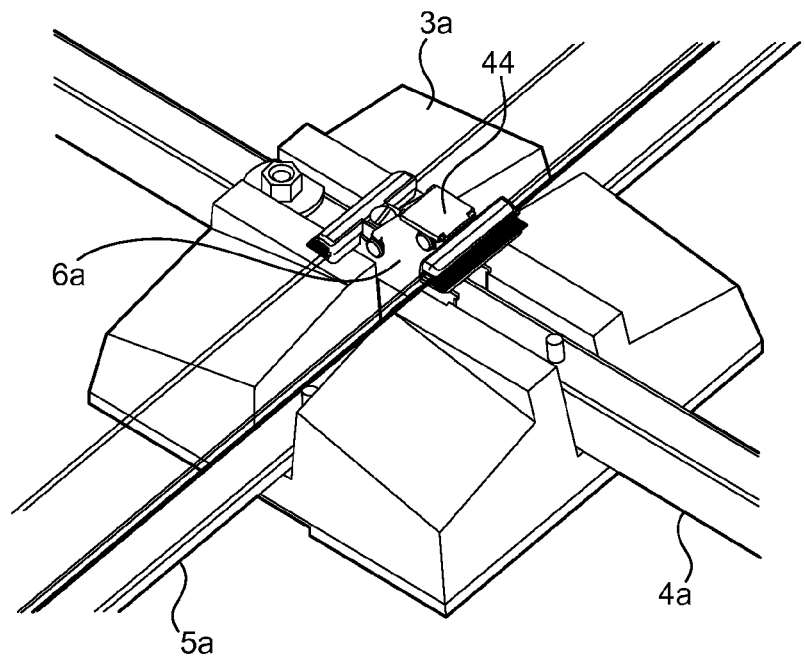
FIG. 2A is a perspective view of one embodiment of the foot, link, tilt bracket and panel clamp assembly according to the present invention.
Figure 2B:
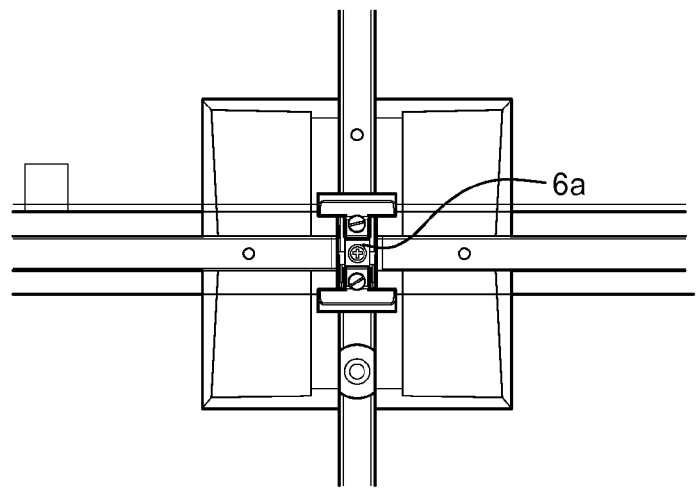
FIG. 2B is a top view of one embodiment of the foot, link, tilt bracket and panel clamp assembly according to the present invention.
Figure 2C:
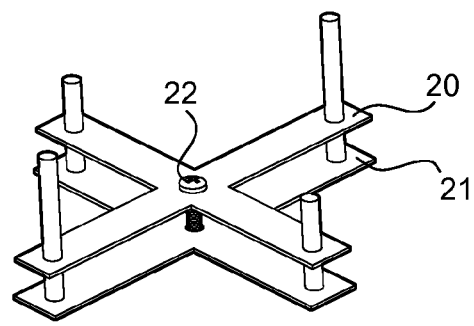
FIG. 2C is a top perspective view of the cruciform and threaded rod assembly embedded in the foot assembly shown in FIG. 2A.
Figure 2D:
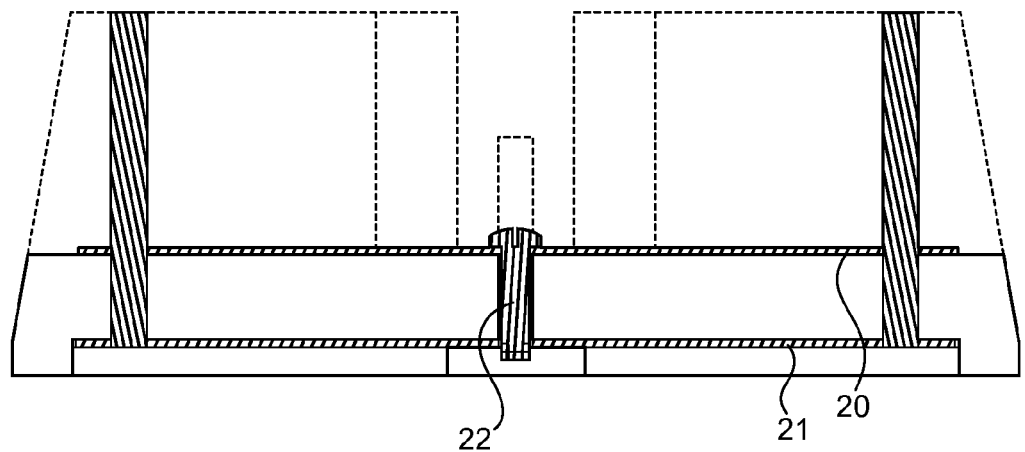
FIG. 2D is cut away section view of the foot and cruciform assembly shown in FIG. 2A.

The construction of a foot 3a is shown in greater detail in FIGS. 2A-2E. An enlarged view of a foot 3a is shown in FIG. 2A. The foot 3a is preferably formed of to rubber or other flexible material. The top of the foot contains two perpendicular slots for attaching the long links and short links. A tilt bracket is located generally in the center of the foot (FIG. 2B; top view). In a preferred embodiment, the foot 3a includes an upper 20 and lower 21 cruciform, as shown in FIG. 2C. The cruciforms are preferably formed from stainless steel. As shown in cross-section in FIG. 2D, the lower cruciform 21 is mounted to the bottom of the rubber foot, and the upper cruciform is attached to the top of the foot, generally aligned with the perpendicular slots. A center bolt 22 attaches the upper and lower cruciforms 20, 21 to the foot. The lower cruciform 21 preferably fits in an indentation shaped like the cruciform in the bottom of the foot. Alternatively, the cruciforms 20, 21 could be molded into the foot at the time the foot is manufactured. Four threaded rods or studs protrude through the cruciforms and foot to provide attachment points for the long and short links. The links are attached to the threaded rods with washers and nuts. For the embodiment of the feet in FIG. 1G, the feet may be formed with a set of cruciforms on each end.

In an alternative embodiment, the foot may be formed with a cement or other similar material rigid base, with a rubber upper section to connect to the links. This may eliminate the need to use the cruciforms. In another alternate embodiment, the foot may be formed with only one cruciform, but the threaded rods have a much larger diameter to counter-act any bending forces.

As described, the mounting system acts like an integrated net—sharing the loads when forces pull up on any part of the system. Specifically, the rubber feet act as "nodes" that are able to flex as forces pull the links outward. However, the two cruciforms provide strength and rigidity to maintain system integrity. The long links to take the down push forces on the solar panels from the wind and snow, and flex at each node. In addition, the modular design allows the system to be installed on an undulating roof, since the rubber feet can adjust to variations in the mounting surface.

Figure 2E:
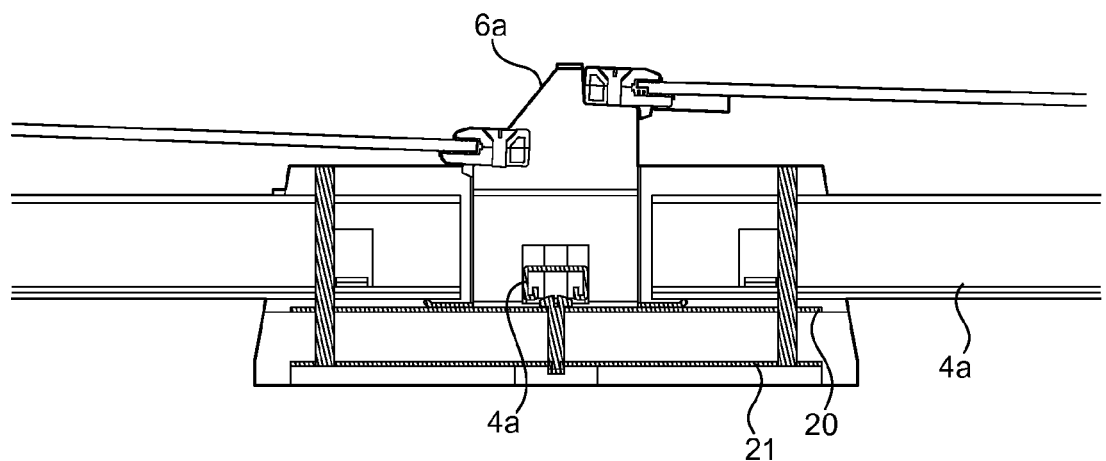
FIG. 2E is cut away section view of the foot and cruciform assembly with the links, PV panels, tilt bracket, and module clamps shown in FIG. 2A.

As shown in FIGS. 2A and 2E, the long links (i.e. 4a) are normally taller in cross-section that the short links (i.e. 5a), since the long links are spanning a greater distance under load. Thus, the steel bolts through the foot are necessarily longer for the long links than for the short links. In assembly, the cruciforms 20, 21 and a tilt bracket (i.e. 6a) are attached to the foot with the center bolt 22. Then the long links (i.e. 4a) and short links (i.e. 5a) are attached to the foot using the threaded rods with the washers and nuts. Note that the long links and short links abut the tilt bracket 6a and overlap the extended bracket sections (see FIG. 5A). With such a modular construction, the entire mounting system can be pre-configured before any panels are attached to the system.

Figure 3A:
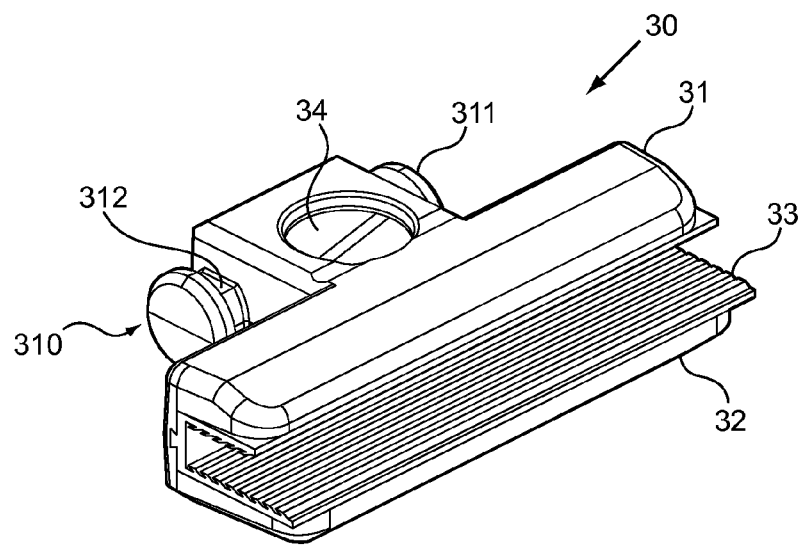
FIG. 3A is a perspective view of a panel clamp embodiment according to the present invention.
Figure 3B:
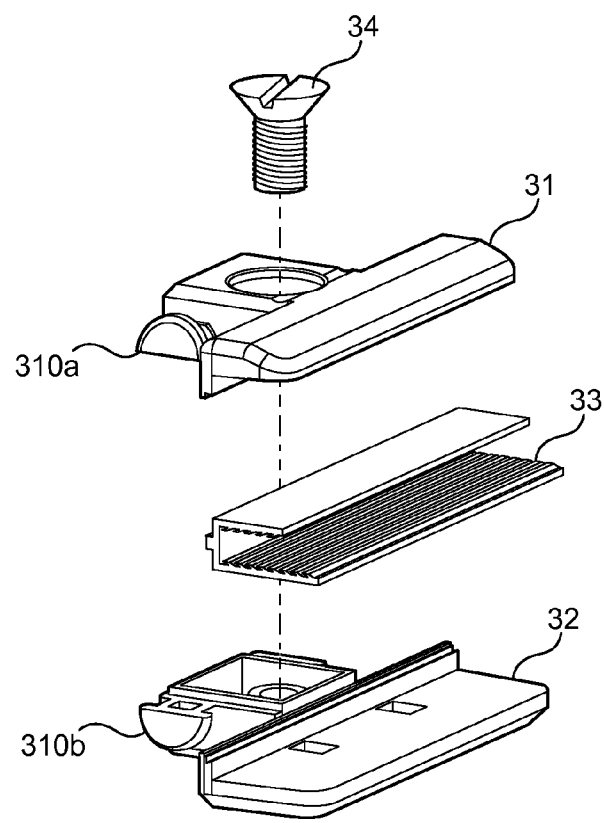
FIG. 3B is an exploded view of the panel clamp of FIG. 3A.

FIGS. 3A and 3B illustrate a panel clamp according to a preferred embodiment of the present invention. As noted earlier, existing mounting systems have difficulty mounting to a frameless panel, and especially to panels made from two sheets of glass. The present clamp 30 is designed to mount such frameless panels to the mounting system of the present invention. The panel clamp 30 includes two main body parts—an upper section 31 and lower 32 section preferably made of cast aluminum. These clamp part sections 31, 32 are held together by a threaded fastener 34 that is inserted through the top section 31 and threaded into the bottom section 32 of the clamp 30. The fastener 32 is preferably a stainless steel bolt having 5/16-18 threads. The interface between the assembled clamp halves (clamp "faces") and the module edge is filled by a flexible gasket material 33. In one embodiment of the invention, the flexible gasket is made from Ethylene Propylene Diene Monomer (EPDM) rubber. This material has small, finger-like protrusions that allow for easy insertion onto the module edge, but makes it more difficult to remove the clamps from the module once installed. The panel clamp 30 is preferably about 4 inches wide and 1 inch high.

In an alternate embodiment, the panel clamp upper and lower sections comprise molded polymer resin that is resistant to the effects of sustained outdoor exposure. These polymer parts have the clamping edge of the assembly overmolded with a flexible rubber material that creates a better grip on the module material which is typically glass.

On each side of the panel clamp 30 is a mounting post 310, 311. The mounting post 310, 311 engages the tilt bracket or mid-link bracket as described below. The mounting post 310 may be formed as part of the upper 310a and lower 310b sections, respectively. The mounting posts 310, 311 are formed similarly to bolt or screw heads, having a larger outer lip or "head" and an inner "collar" 312 of smaller diameter. In an alternate design, the mounting posts may comprise a separate metal element, formed with a head and collar on each end, and held in place between the upper 31 and lower 32 sections. In a preferred configuration, each mounting post 310, 311 has the upper and lower portions (edges) of each "collar" 312 of the mounting post flattened off, in order to help prevent rotation of the clamp in a bracket once it is installed.

Figure 3C:
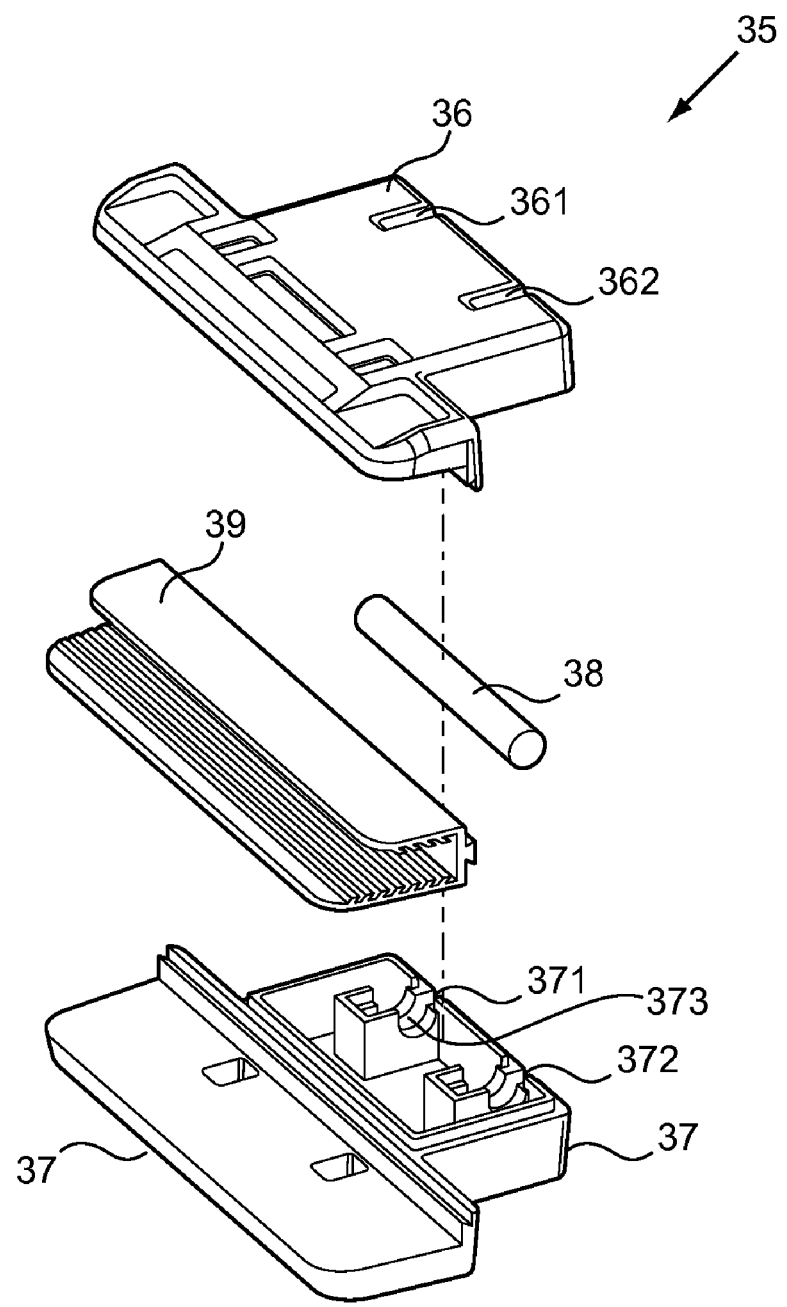
FIG. 3C is an exploded view of an alternate embodiment of the panel clamp.
Figure 3D:
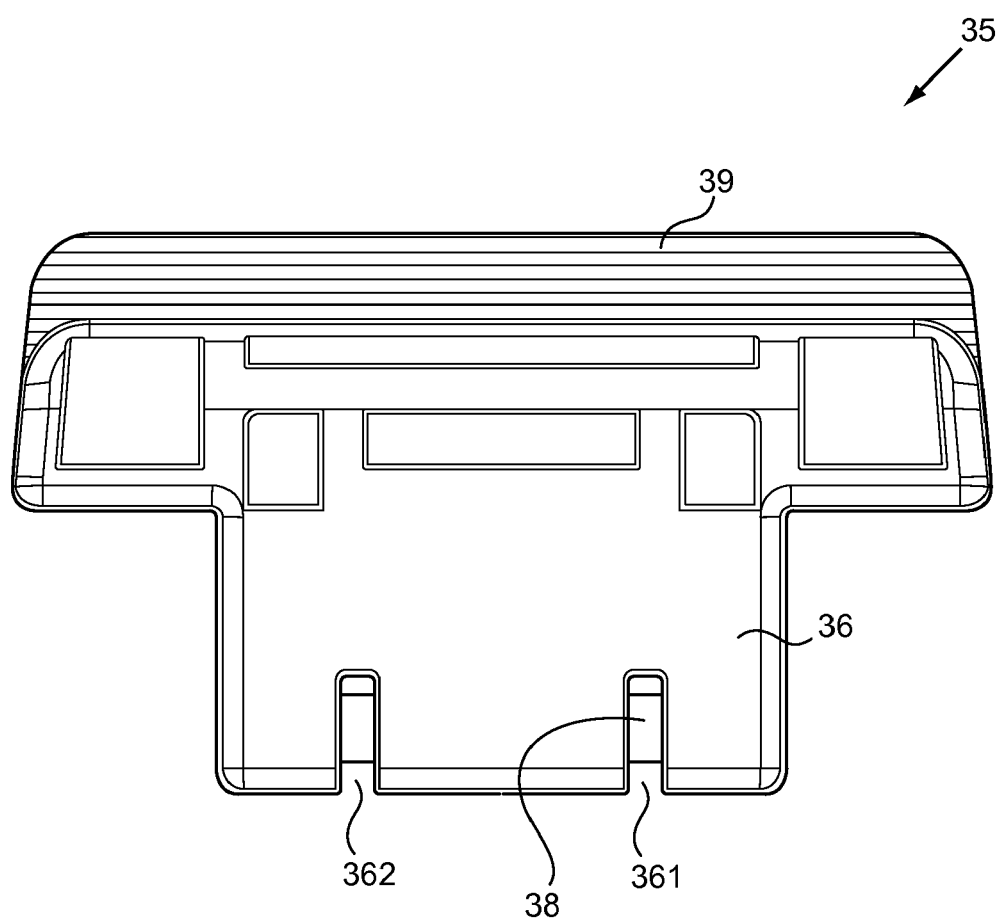
FIG. 3D is a top view of the clamp of FIG. 3C.

An alternate panel clamp design is illustrated in FIGS. 3C and 3D. As shown in FIG. 3C, the panel clamp 35 includes an upper section 36 and a lower section 37. Those sections 36, 37 may be formed out of plastic and configured to "snap" fit or glued together. Other materials may be used, and the two sections may be held together by a threaded bolt as previously described. The upper section includes two slots 361, 362 spaced to engage the tilt and mid-link bracket openings. Similarly, the lower section includes slots 371, 372 aligned with the slots 361, 362 in the upper section. A mounting axle (rod) 38 is held in a half channel 373 in the lower section 37, and a similar half channel (not shown) formed in the upper section 36. The axle 38 is held in position by the upper 36 and lower sections 37, and is generally perpendicular to the blots. A grommet 39 is positioned between the clamp sections to grip the panel, and may be constructed as noted above.

FIG. 3D shows the assembled clamp, and the axle 38 exposed through the slots. In operation, the panel clamp 35 is lowered into a bracket such that the axle 38 engages the mounting openings (described in detail below) in a bracket.

As described herein, the panel clamp comprises two pieces. However, the clamps may be molded as single pieces as well.

While specific preferred mounting clamps have been described herein, other panel mounting structures may be utilized with the present system, as long as the mounting structures are configured to interface with the mounting openings in the tilt and mid-link brackets.

Figure 4A:
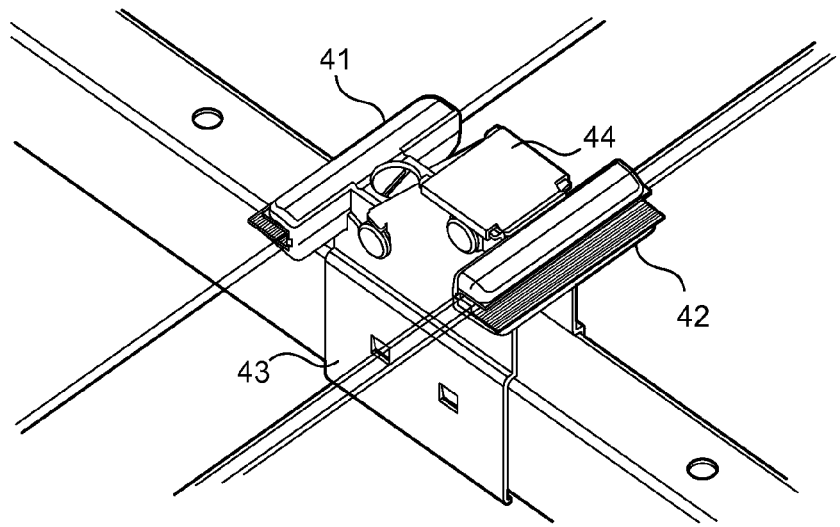
FIG. 4A is a perspective view of the panel clamps of FIG. 3A assembled into a tilt bracket mounted to the top of structural link.
Figure 4B:
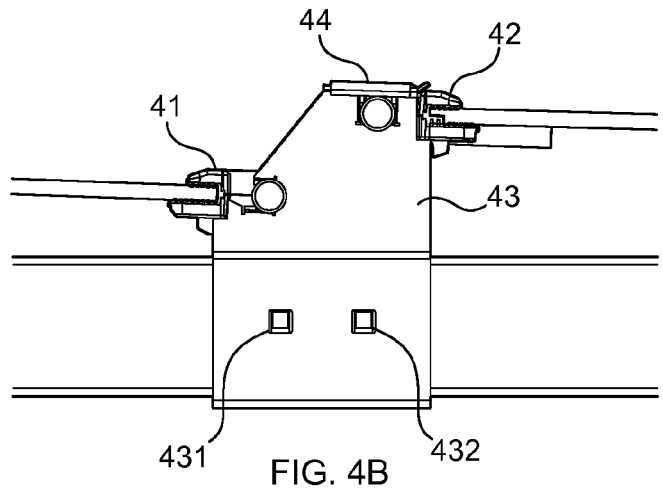
FIG. 4B is a side view showing the panel clamps of FIG. 3A attached to the solar panels and the tilt bracket.
Figure 4C:
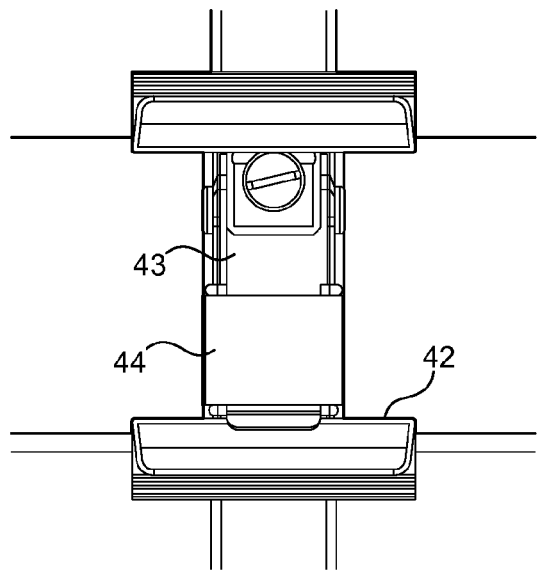
FIG. 4C is a top view of the panel mounting clamps of FIG. 3A shown attached to the edges of the solar panels in an array.

Once the mounting system has been assembled, the mounting clamps are attached to the photovoltaic panels. Two clamps are attached to each (long) side of a panel at a quarter distance point on each edge, as shown in FIGS. 1A and 1C. FIGS. 4A, 4B and 4C illustrate two panel clamps attached to a mid-link bracket in an isometric view, side view and top view, respectively. One clamp 41 attaches to the mid-link bracket at a side position via its mounting posts, effectively making the panel edge lower than the other side. Similarly, a second clamp 42 attaches to a top of the mid-link bracket via its mounting posts. A locking cap 44 may, be slid over the top of the top clamp 42 to help prevent uplift forces from disengaging the clamp 42 from the bracket 43. The locking cap 44 can be configured to slide over the bracket 43, which also helps keep the bracket from spreading open under loads. The locking cap 44 may be formed from metal with the sides bent down, and a in-facing lip on each edge (i.e. forming a block "C" in profile). Each side has a lip to engage the bracket and slides over the top of the bracket to lock into position.

The mid-link bracket 43 preferably slides onto a long link from the bottom, and engages pre-formed holes in the long link. For example, square holes can be punched into the long links to engage indented tabs 431, 432 punched into the mid-link bracket 43.

Figure 4D:
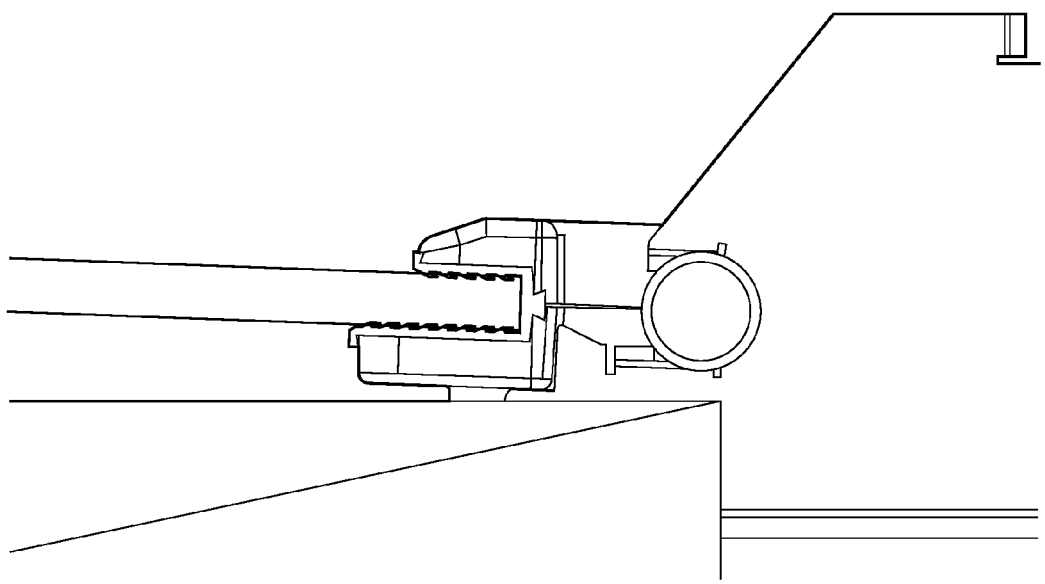
FIG. 4D is an enlarged view of the clamp attached to a solar panel.

FIG. 4D is an enlarged side view of the panel clamp 30 attached to a solar panel. Note that the "fingers" of the rubber grommet material are angled such that the clamp can more easily slide onto a solar panel, but resists the removal of the clamp in the reverse direction. This embodiment is suitable for panels where the top and bottom sheets of glass are aligned.

Figure 4E:
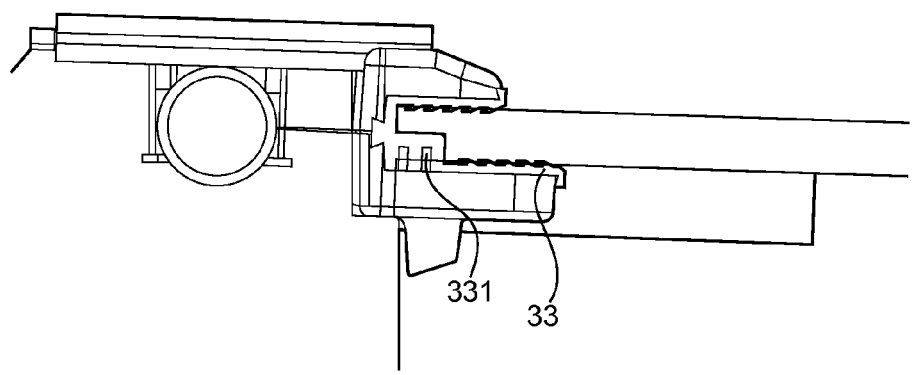
FIG. 4E is an enlarged side view of an alternative embodiment of the panel clamp for use with panels have an offset lower edge.

In certain solar panels, the bottom sheet of glass is 0.5 inch or so narrower than the top sheet to allow for the electrical wiring and/or connectors. The panels are formed such that the glass sheets are flush on one edge, and offset on the other. Thus, on one edge of the panel the panel clamps need to account for this offset. As shown in FIG. 4E, in an alternate embodiment, the rubber grommet 33 may be formed with a rectangular filler block 331 to fill in the gap in the edge of the panel.

Figure 4F:
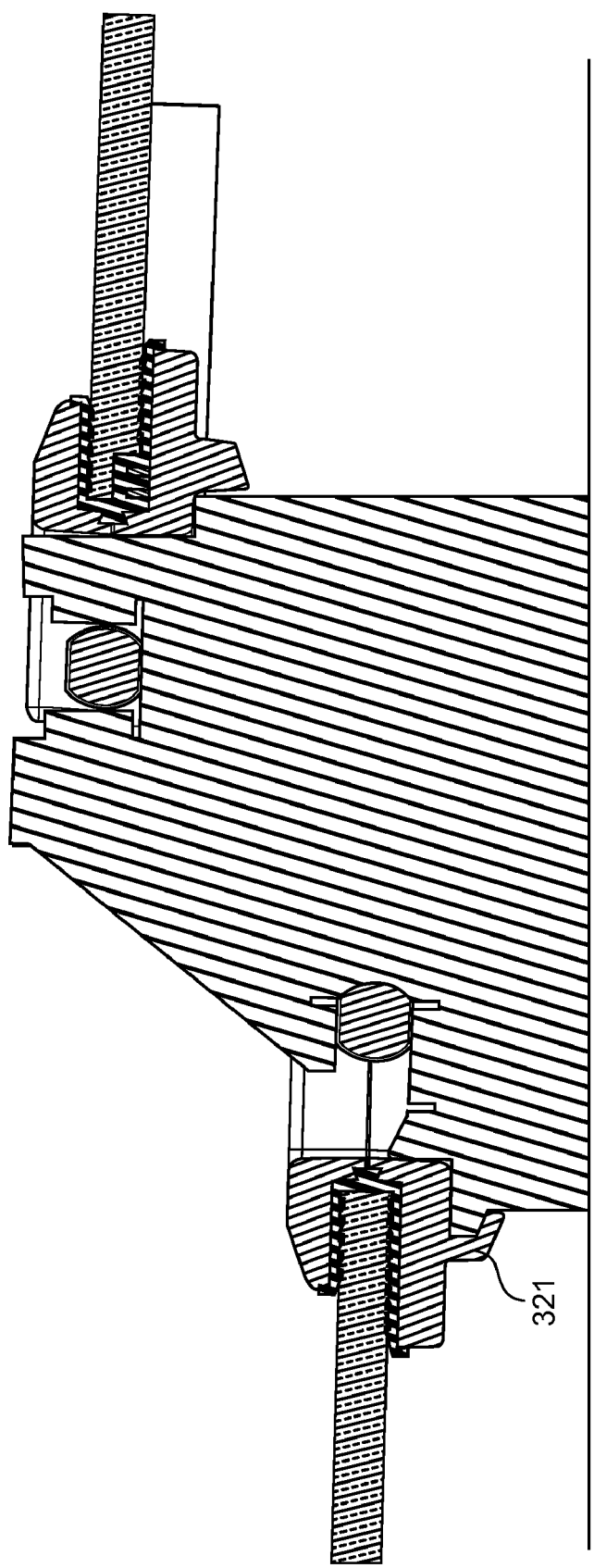
FIG. 4F is a side view of the panel clamp and bracket assembly illustrating the locking tongue on the bottom of the panel clamp.

In addition, as shown in FIG. 4F, the panel clamps are preferably formed with a locking tongue 321 on the bottom of the clamp to engage tabs on the tilt and mid-link brackets (as described below).

Figure 5A:
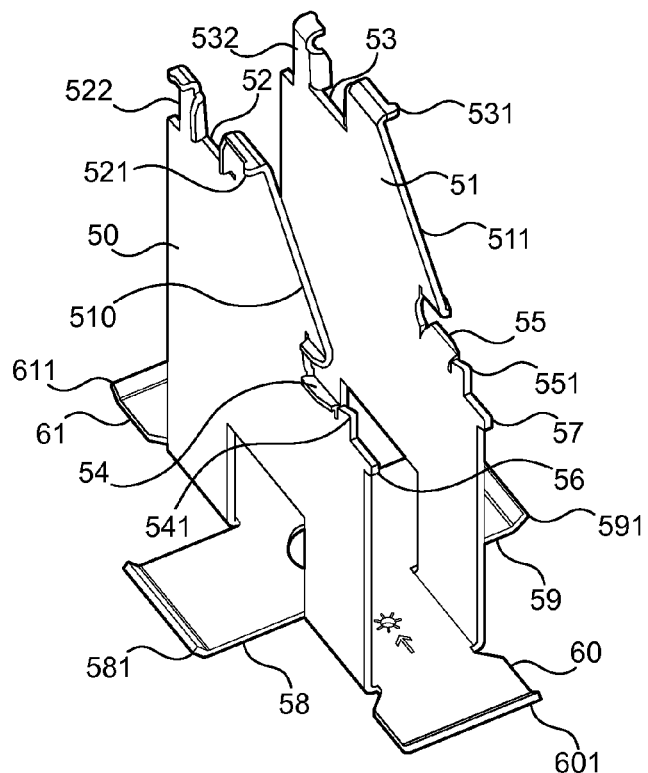
FIG. 5A is a perspective view of the tilt bracket that is mounted to the top of the foot assembly.
Figure 5B:
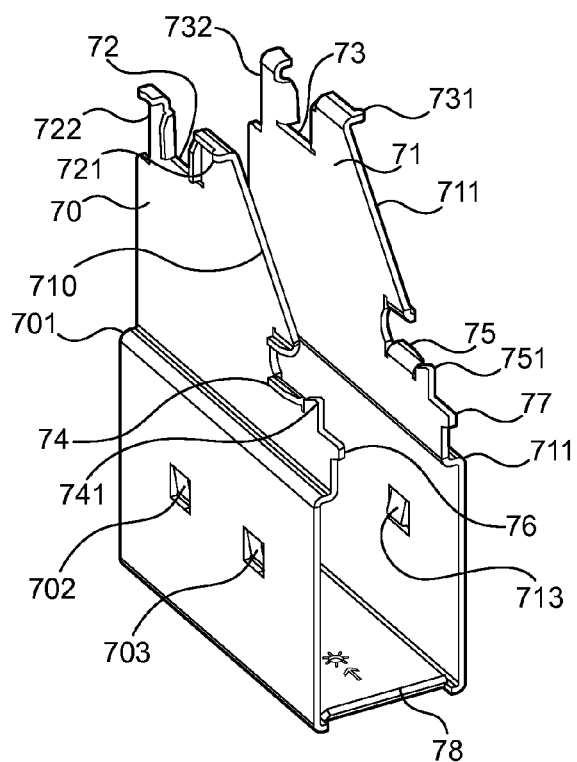
FIG. 5B is a perspective view of the tilt bracket that is mounted to the middle of the structural link component.

A detailed view of the tilt bracket is shown in FIG. 5A, and a detailed view of the mid-link bracket is shown in FIG. 5B. Note that the top halves of both brackets are generally similar in construction, with the main differences on the lower halves of the brackets. The brackets are preferably formed from sheet metal as unitary pieces.

In FIG. 5A, the tilt bracket comprises two symmetric sides 50, 51. On the top of each side is a mounting opening 52, 53 for a panel clamp mounting post. Behind each mounting opening 52, 53 is a notch 522, 532 for engaging the clamp. The bracket includes a tab 521, 531 on each side of the top to lock the locking cap (not shown) into place. A front face of each side 50, 51 has an angled edge 510, 511, which helps guide a panel clamp into the lower mounting openings 54, 55 during installation. Each lower mounting opening 54, 55 include a catch 541, 551 to guide and secure the panel clamp into place. The lower mounting openings 54, 55 are deep enough to allow some horizontal movement of the panel clamp in the bracket to facilitate some movement and alignment of a panel during installation. Each side also includes a locking tab 56, 57 to engage a locking tongue 321 on a panel clamp. Any upward forces on a panel will cause the panel clamp to try and lift up. However, due to the engagement of the panel clamp with the locking tabs 56, 57, the upward force is distributed through the mounting system via the bracket.

The tilt bracket, as discussed above, is mounted to a foot. The long links engage front 60 and rear 61 extensions, while the short links engage the side extensions 58, 59. The overlapping of the links with the extensions provided for load sharing between the elements. In order to improve the element-to-element grounding of the metal components, each extension includes a lip 601, 611, 581, 591 to "bite" into the links and insure a solid metal-to-metal ground connection.

As noted above the construction of the upper half of the mid-link bracket is similar to the construction of the upper half of the tilt bracket. As shown in FIG. 5B, the mid-link bracket comprises two symmetric sides 70, 71. On the top of each side is a mounting opening 72, 73 for a panel clamp mounting post. Behind each mounting opening 72, 73 is a notch 722, 732 for engaging the clamp. The bracket includes a tab 721, 731 on each side of the top to lock the locking cap (not shown) into place. A front face of each side 70, 71 has an angled edge 710, 711, which helps guide a panel clamp into the lower mounting openings 74, 77 during installation. Each lower mounting opening 74, 77 include a catch 741, 751 to guide and secure the panel clamp into place. The lower mounting openings 74, 75 are deep enough to allow some horizontal movement of the panel clamp in the bracket to facilitate some movement and alignment of a panel during installation. Each side also includes a locking tab 76, 77 to engage a locking tongue 321 on a panel clamp. Any upward forces on a panel will cause the panel clamp to try and lift up. However, due to the engagement of the panel clamp with the locking tabs 76, 77, the upward force is distributed through the mounting system via the bracket.

The mid-link bracket, as discussed above, is mounted to a long link, and preferably snaps into place from the bottom of the link. Thus, the lower portion of the mid-link bracket is configured to conform to the size and shape of a long link. The top portion of the mid-link bracket is recessed 701, 711 to insure a tight fit around the long link. In addition, alignment and grounding tabs 702, 703, 713 (one not shown) preferably engage in square holes pre-punched into the long link. Again, to improve metal-to-metal contact for grounding the front and rear (not shown) of the link channel include a lip 78 to improve grounding.

As mentioned earlier, one of the advantages of the present mounting system is that the size and lengths of the long and short links may be adjusted as needed for particular installations. For example, in colder climates with winter snows and high winds, the links may need to be stronger to support the increased loads. In a standard implementation, the long links are approximately 1⅝"×2¾" in cross-section and the short links are 1⅝"×1". However, to support heavier loads, the links may be formed out of a heavier gauge steel. In order to reduce, costs, though, the entire mounting system may not need to be made out of the thicker steel. Specifically, the long and short links may have a uniform external profile, but varied strength depending on a location within a panel array, or the links may have different cross-sections for different applications.

Figure 6A:
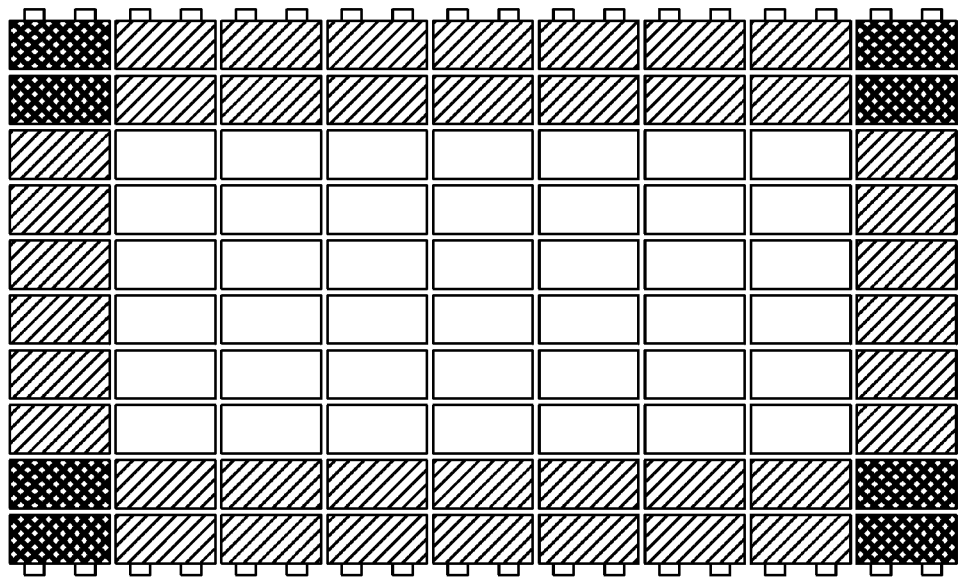
FIG. 6A is a plan view of a the solar module array in a basic rectangular formation.
Figure 6B:
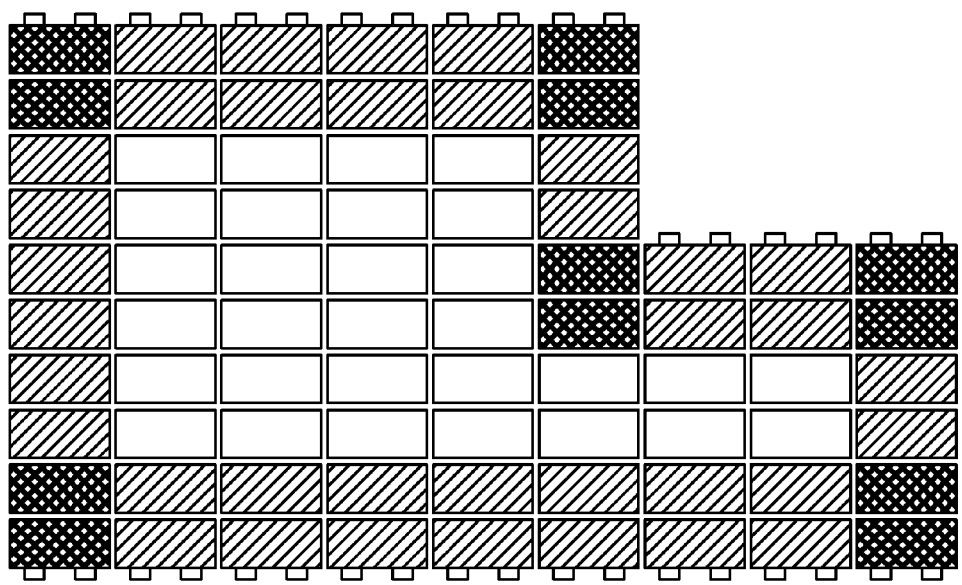
FIG. 6B is a plan view of a the solar module array in a geometric pattern having more than four corner areas.

For example, in a standard rectangular roof top installation as illustrated in FIG. 6A, the strongest wind uplift forces are present at the corner panels (black checked rectangles). Since many installations must accommodate roof features such as HVAC equipment, vents, etc. many panel assemblies have more than four "corners", as shown in FIG. 6B. Moderate uplift forces are present along the edges (hashed rectangles), while the interior panels (white rectangles) experience relatively lower uplift forces. With this understanding of the relative wind forces at different sections, the mounting system can be constructed accordingly. For example, the long and short links can be constructed out of relatively heavy gauge steel for the perimeter panels, and from thinner (and hence cheaper) steel for the interior panels. The respective links can be color coded for easy identification by installation personnel.

Figure 7A:
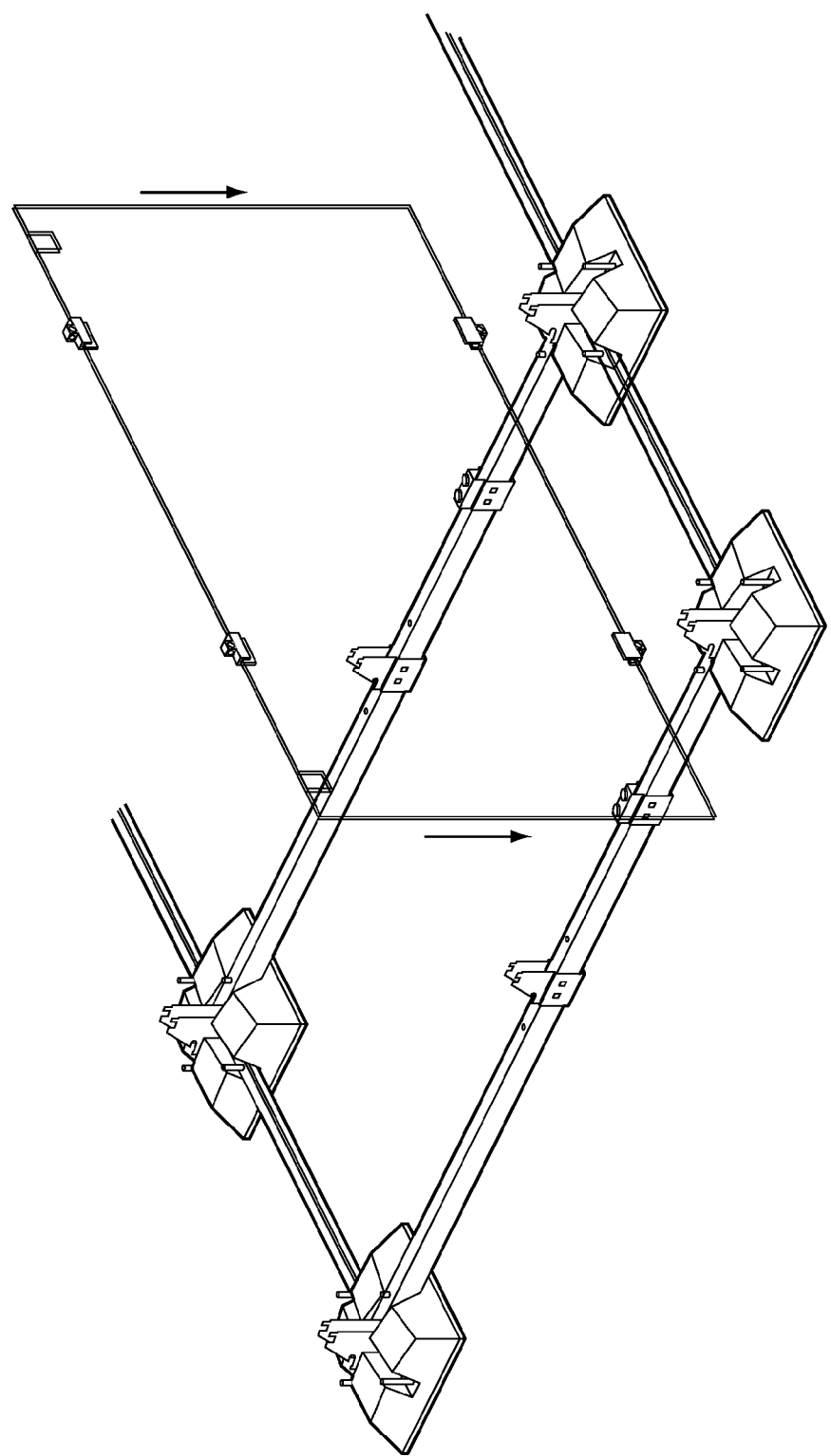
FIGS. 7A-7D illustrate the installation and mounting sequence for a solar panel into the mounting system of the present invention.
Figure 7B:
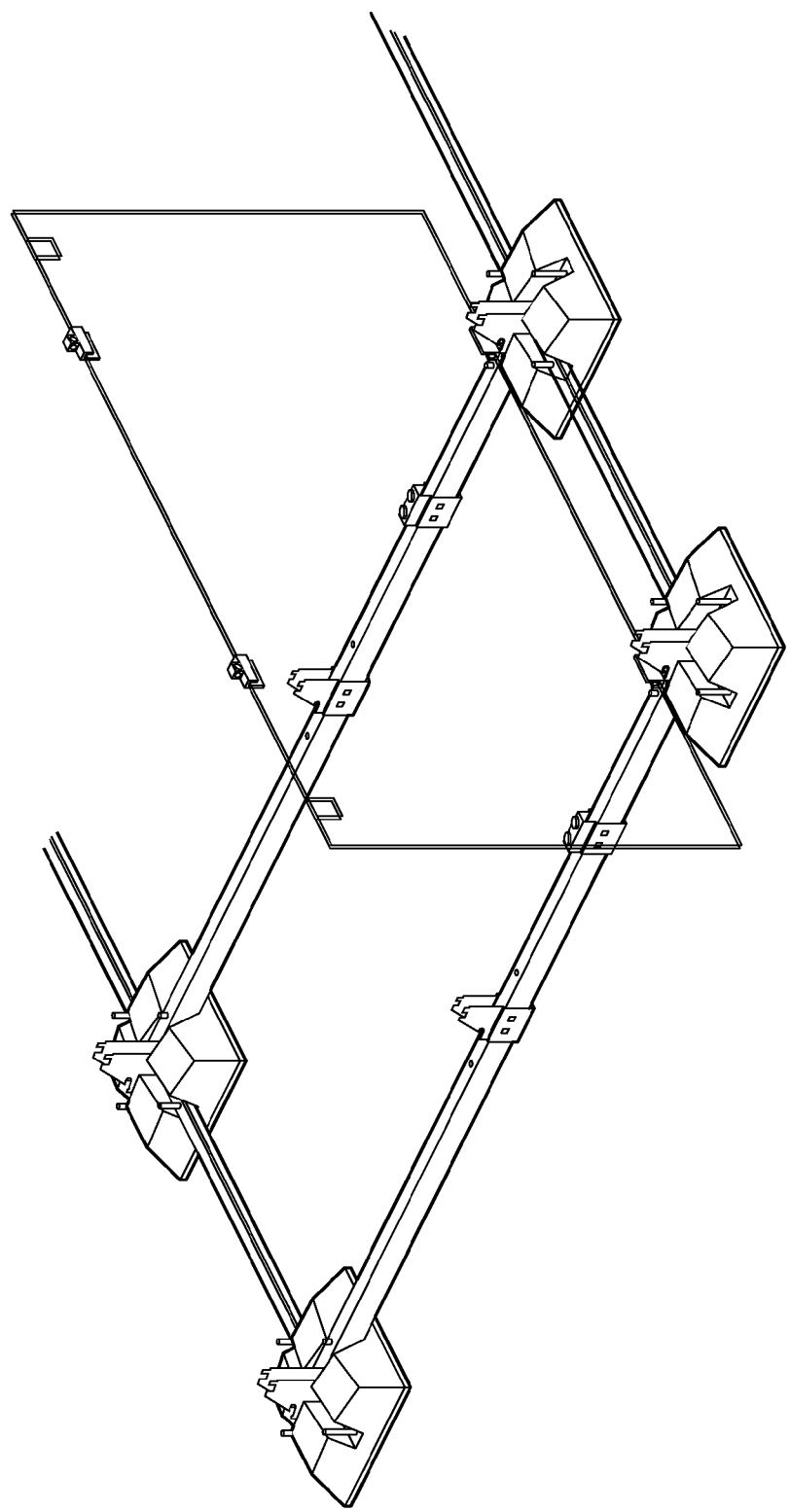
Figure 7C:
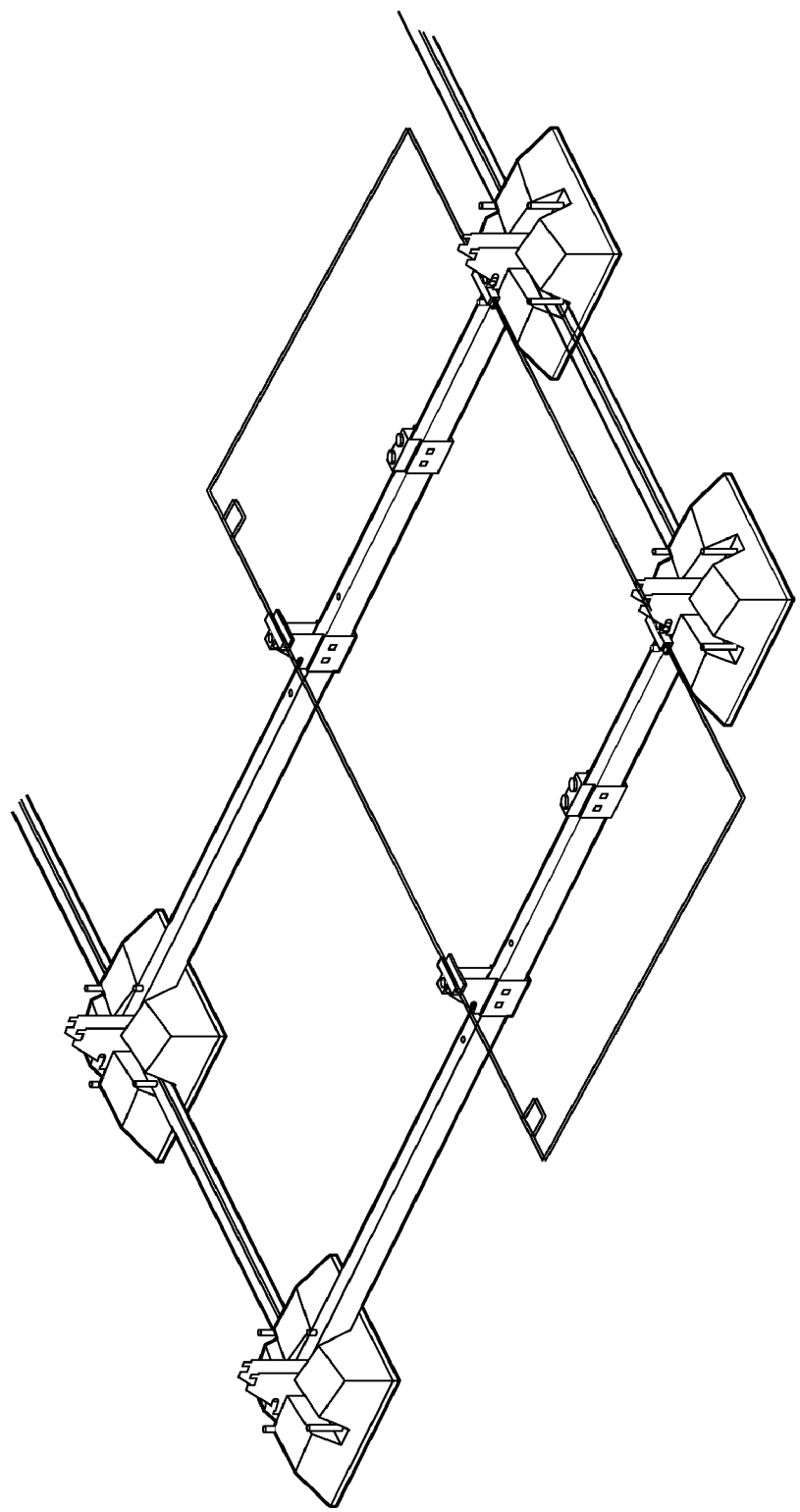
Figure 7D:
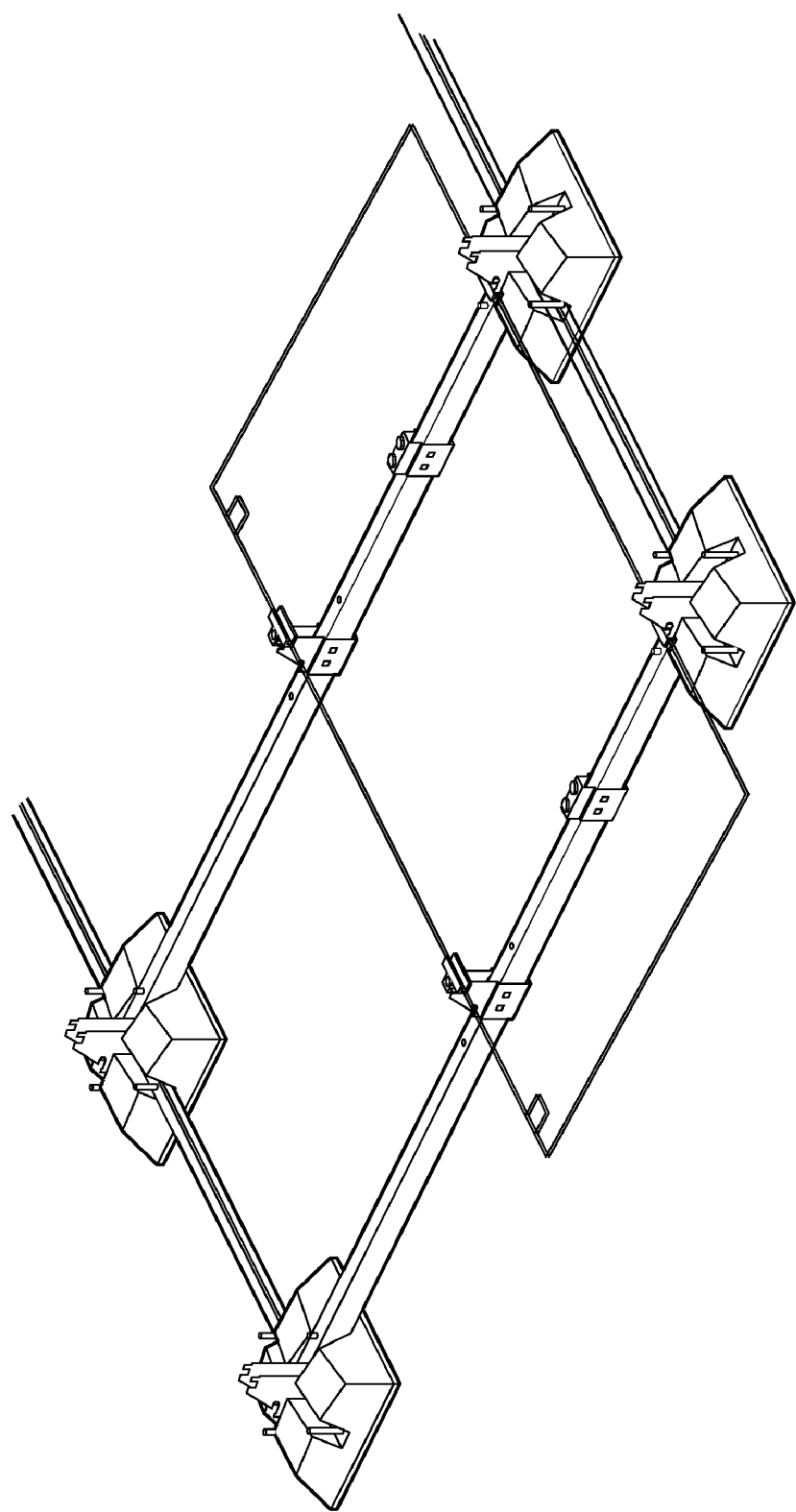

Once the four panel clamps are installed on a solar panel, the panel is lifted into position over two tilt brackets as shown in FIG. 7A. Next, the mounting posts of the panel clamps are aligned with the lower mounting openings in the front of each tilt bracket, and the panel is set into place, as shown in FIG. 7B. The panel is then lowered towards the two mid-link brackets as illustrated in FIG. 7C. Finally, the panel is slid forward into the tilt brackets, and then the panel clamps are aligned and set into the mid-link brackets (FIG. 7D). Note as described above, the lower mounting openings in the tilt brackets have enough depth to allow the panel to slide into the bracket, which helps lock the panel in place. A locking cap is then applied to the top of each mid-link bracket to lock the respective panel clamps in place.

Figure 8:
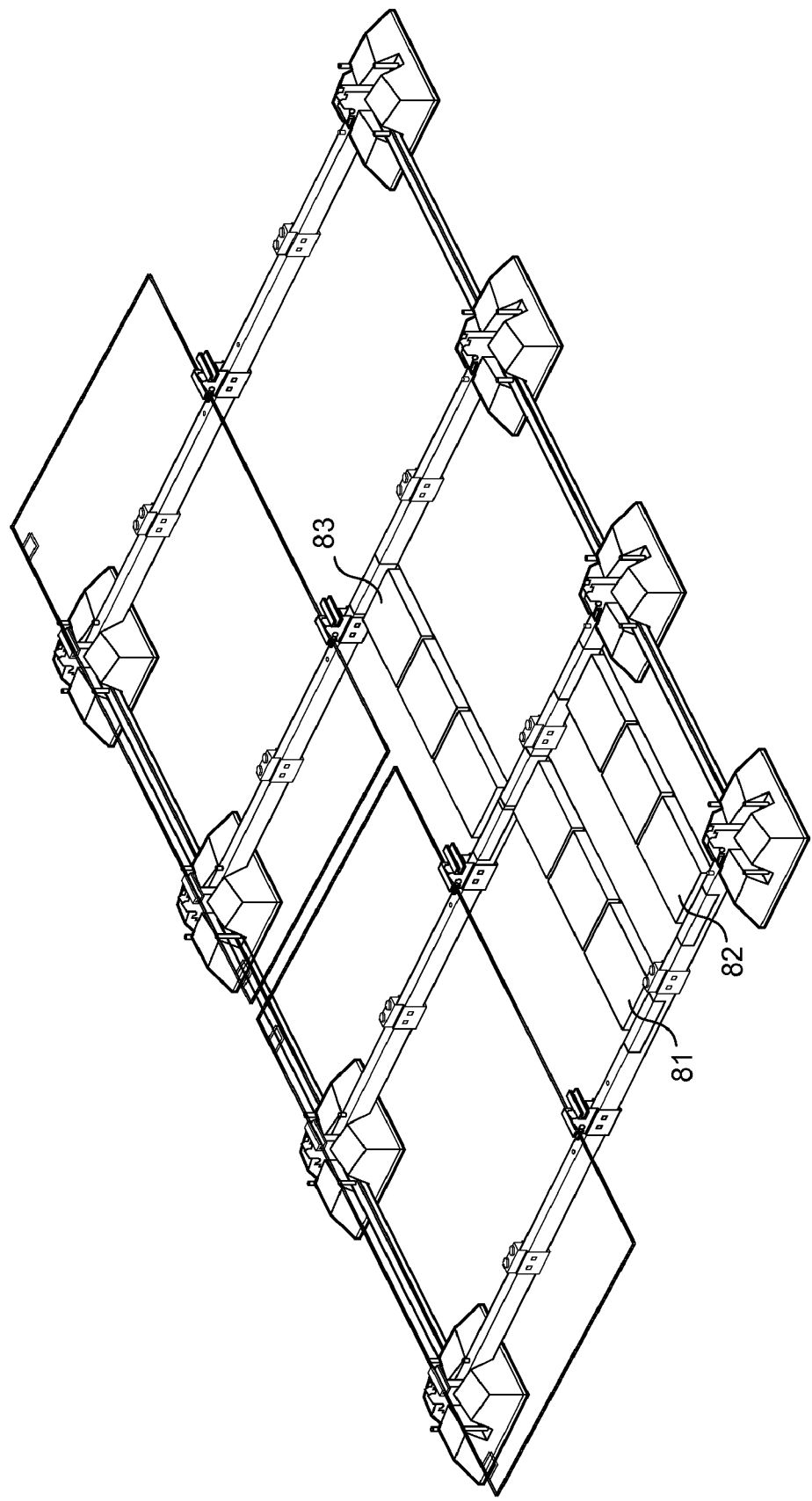
FIG. 8 illustrates the mounting of optional ballast pans onto the mounting system of the present invention.

If additional system ballast is needed for a particular installation, ballast pans 81, 82, 83, such as shown in FIG. 8, may be added to the system between adjacent long links. Ballast can then be placed in the pans 81, 82, 83 to provide additional weight to the system. Different arrangements and configurations of the ballast pans can be deployed as necessary.

In environments where the system may be subjected to significant loads, such as heavy snow, additional feet can be placed under to the mid-link brackets to provide additional support. In this configuration, the feet are not necessarily attached to the mid-link brackets, but provide additional load bearing support points for the system.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A photovoltaic module mounting system comprising:
    a plurality of feet, each foot formed at least partially from a flexible material, wherein each foot comprises:
        a rubber body having two perpendicular slots on a top surface; and
        at least one metal cruciform attached to the rubber body;
    a tilt bracket attached to each foot;
    a plurality of metal first links connecting the feet together in an axis of a first direction;
    a plurality of metal second links connecting the feet together in an axis of a second direction;
    wherein the feet, first links and second links form an integrated grid for mounting photovoltaic modules.

2. The mounting system of claim 1, wherein the foot comprises two metal cruciforms, wherein one cruciform is attached to a bottom surface of the rubber body, and a second cruciform is attached on the a top of the body in the two perpendicular slots.

3. The mounting system of claim 2, wherein each foot further comprises a plurality of threaded rods to connect the first and second links to the foot.

4. The mounting system of claim 3, wherein the tilt bracket is bolted to the foot on top of the second cruciform.

5. A photovoltaic mounting system comprising:
    a plurality of feet, each foot comprising:
        a rubber body having two perpendicular slots on a top surface; and
        two metal cruciforms, wherein one cruciform is attached to a bottom surface of the rubber body, and a second cruciform is attached on top of the rubber body in the two perpendicular slots;
    a tilt bracket attached to each foot, wherein the tilt bracket comprises:
        an upper mounting opening;
        a lower mounting opening;
        an angled front edge, located between the upper and lower mounting openings; and
        four extensions which align with the respective slots of a respective foot, each extension having a lip to engage a link;
    a plurality of metal first links connecting the feet together in a first direction;
    a plurality of metal second links connecting the feet together in a second direction; and
    wherein the feet, first links and second links form an integrated grid for mounting photovoltaic modules.

6. The mounting system of claim 5, further comprising:
    at least one mid-link bracket connected to a first link between the feet, the mid-link bracket comprising:
        an upper mounting opening;
        a lower mounting opening;
        an angled front edge, located between the upper and lower mounting openings; and
        a mounting channel having a lip on each end to engage a link.

7. The mounting system of claim 5, further comprising at least one center panel support connected to each first link between feet.

8. The mounting system of claim 5, further comprising a foot arranged under each mid-link bracket.

9. A photovoltaic system comprising:
    a photovoltaic mounting system comprising:
        a plurality of feet, each foot comprising:
            a rubber body having two perpendicular slots on a top surface; and
            two metal cruciforms, wherein one cruciform is attached to a bottom surface of the rubber body, and a second cruciform is attached on top of the rubber body in the two perpendicular slots;
        a tilt bracket attached to each foot, wherein the tilt bracket comprises:
            an upper mounting opening;
            a lower mounting opening;
            an angled front edge, located between the upper and lower mounting openings; and
            four extensions which align with the respective slots of a respective foot, each extension having a lip to engage a link;
        a plurality of metal first links connecting the feet together in a first axis direction;
        a plurality of metal second links connecting the feet together in a second axis direction;
        at least one mid-link bracket connected between the feet, the mid-link bracket comprising:
            an upper mounting opening;
            a lower mounting opening;
            an angled front edge, located between the upper and lower mounting openings; and
            a mounting channel having a lip on each end to engage a link;
        wherein the feet, first links and second links form an integrated grid for mounting photovoltaic modules; and
    a plurality of photovoltaic modules, each module having four mounting points, wherein the mounting points are attached to respective mounting openings in the tilt and mid-link brackets.

* * * * *